United States Patent
Luo et al.

(10) Patent No.: US 8,428,521 B2
(45) Date of Patent: Apr. 23, 2013

(54) CONTROL FOR UPLINK IN MIMO COMMUNICATION SYSTEM

(75) Inventors: Xiliang Luo, Northridge, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 381 days.

(21) Appl. No.: 12/849,185

(22) Filed: Aug. 3, 2010

(65) Prior Publication Data

US 2011/0207415 A1 Aug. 25, 2011

Related U.S. Application Data

(60) Provisional application No. 61/231,289, filed on Aug. 4, 2009.

(51) Int. Cl.
*H04B 1/00* (2006.01)
(52) U.S. Cl.
USPC .............................. 455/69; 455/101
(58) Field of Classification Search .................. 455/69, 455/522, 13.4
See application file for complete search history.

(56) References Cited

U.S. PATENT DOCUMENTS

| | | | | |
|---|---|---|---|---|
| 7,629,902 B2 * | 12/2009 | Zhang et al. | ................ | 341/106 |
| 2008/0130790 A1 * | 6/2008 | Forenza et al. | ............... | 375/299 |
| 2008/0233902 A1 * | 9/2008 | Pan et al. | ................... | 455/114.3 |

FOREIGN PATENT DOCUMENTS

| WO | WO2008067471 | | 6/2008 |
|---|---|---|---|
| WO | WO2009022868 | A1 | 2/2009 |

OTHER PUBLICATIONS

International Search Report and Written Opinion—PCT/US2010/044462—International Search Authority, European Patent Office,Feb. 4, 2011.
Motorola: "Multi-Antenna Uplink Transmission for LTE-A",3GPP Draft; R1-090794 Multi-Antenna UL Transmission (Motorola), 3rd Generation Partnership Project (3GPP), Mobile Competence Centre ; 650, Route Des Lucioles ; F-06921 Sophia-Antipolis Cedex ; France, no. Athens, Greece; 20090203, Feb. 3, 2009, XP050318651, [retrieved on Feb. 3, 2009] the whole document.
Motorola: "UL-MIMO with Antenna Gain Imbalance", 3GPP Draft; R1-090327 UL-MIMO With AGI (Motorola) Final, 3rd Generation Partnership Project (3GPP), Mobile Competence Centre ; 650, Route Des Lucioles ; F-06921 Sophia-Antipolis Cedex ; France, no. Ljubljana; 20090107, Jan. 7, 2009, XP050318238, [ retrieved on Jan. 7, 2009] the whole document.
Research in Motion: "Impact of Gain Imbalance on MSRD Performance",3GPP Draft; GP-060831-Impact of Gain Imbalance for MSRD, 3rd Generation Partnership Project (3GPP), Mobile Competence Centre ; 650, Route Des Lucioles ; F-06921 Sophia-Antipolis Cedex ; France, vol. TSG GERAN, no. San Jose del Cabo, Mexico; 20060424, Apr. 24, 2006, XP050015916, [retrieved on Apr. 24, 2006] the whole document.

* cited by examiner

*Primary Examiner* — Tu X Nguyen
(74) *Attorney, Agent, or Firm* — Liem T. Do

(57) ABSTRACT

In a wireless communication network that performs Multiple Input Multiple Output (MIMO) communication, uplink power control signals are provided to a user equipment (UE) via a base station signaled power allocation scheme responsive to a determination of whether or not the uplink transmission is in a interference limited condition relative to a neighboring cell.

36 Claims, 27 Drawing Sheets

CONTROL FOR UPLINK IN MIMO COMMUNICATION SYSTEM

CROSS-REFERENCE TO RELATED APPLICATION

This application claims priority pursuant to 35 U.S.C. §119(e) to U.S. Provisional Application Ser. No. 61/231,289, filed Aug. 4, 2009, which application is specifically incorporated herein, in its entirety, by reference.

BACKGROUND

1. Field

The present disclosure relates generally to communication, and more specifically for uplink transmit power control and power allocation across multiple transmit antennas in a wireless communication network.

2. Background

The 3rd Generation Partnership Project (3GPP) Long Term Evolution (LTE) represents a major advance in cellular technology and is the next step forward in cellular 3G services as a natural evolution of Global system for mobile communications (GSM) and Universal Mobile Telecommunications System (UMTS). LTE provides for an uplink speed of up to 50 megabits per second (Mbps) and a downlink speed of up to 100 Mbps and brings many technical benefits to cellular networks. LTE is designed to meet carrier needs for high-speed data and media transport as well as high-capacity voice support well into the next decade. Bandwidth is scalable from 1.25 MHz to 20 MHz. This suits the needs of different network operators that have different bandwidth allocations, and also allows operators to provide different services based on spectrum. LTE is also expected to improve spectral efficiency in 3G networks, allowing carriers to provide more data and voice services over a given bandwidth. LTE encompasses high-speed data, multimedia unicast and multimedia broadcast services.

The LTE physical layer (PHY) is a highly efficient means of conveying both data and control information between an evolved Node B (eNodeB) and user equipment (UE). The LTE PHY employs some advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

Recently, LTE Advanced is an evolving mobile communication standard for providing 4G services. Being defined as 3G technology, LTE does not meet the requirements for 4G also called IMT Advanced as defined by the International Telecommunication Union such as peak data rates up to 1 Gbit/s. Besides the peak data rate, LTE Advanced also targets faster switching between power states and improved performance at the cell edge.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for uplink multiple antenna transmit power control in a wireless communication network by employing a processor executing computer executable instructions stored on a computer readable storage medium to perform certain acts for controlling transmit power for multiple uplink antennas of user equipment (UE) in a wireless communication network, comprising: instructing the UE to compensate for antenna gain imbalance (AGI) between the multiple uplink antennas in response to determining that uplink transmission from the UE is in an interference limited condition; and instructing the UE to perform total power control for the multiple uplink antennas in response to determining that uplink transmission from the UE is not in an interference limited condition.

In another aspect, a computer program product is provided for uplink multiple antenna transmit power control in a wireless communication network. At least one computer readable storage medium stores computer executable instructions, that when executed causes a computer to perform the actions of: providing a signal instructing UE to compensate for AGI between a plurality of transmit antennas, in response to determining uplink transmission is in an interference limited condition; and providing a signal instructing the UE to perform total power control for the plurality of transmit antennas, in response to determining uplink transmission is not in an interference limited condition.

In an additional aspect, an apparatus is provided for uplink multiple antenna transmit power control in a wireless communication network. The apparatus comprises a first means for instructing UE to compensate for AGI between a plurality of transmit antennas, in response to determining uplink transmission is in an interference limited condition relative to a neighboring cell. The apparatus further comprises a second means for instructing the UE to perform total power control for the plurality of transmit antennas, in response to determining uplink transmission is not in an interference limited condition relative to the neighboring cell.

In a further aspect, an apparatus is provided for uplink multiple antenna transmit power control in a wireless communication network. The apparatus comprises a memory holding instructions for providing a signal instructing User Equipment (UE) having multiple uplink antennas to compensate for antenna gain imbalance (AGI) between the multiple uplink antennas, in response to determining that uplink transmission from the UE is in an interference limited condition. The memory also holds instructions for providing a signal instructing the UE to perform total power control for the multiple uplink antennas in response to determining that uplink transmission from the UE is not in an interference limited condition. The apparatus further comprises a processor that executes these instructions.

In yet another aspect, a method for providing control parameters for uplink transmission from multiple uplink antennas of UE in a wireless communication network, using a processor in communication with the UE for receiving a report from the UE characterizing total power headroom and antenna gain imbalance (AGI) for the multiple uplink antennas. The method further comprises using the processor for determining a power allocation scheme, a transmission rank and a precoding matrix in response to the report. The method further comprises using the processor for transmitting the power allocation scheme, the transmission rank and the precoding matrix to the user equipment for use for uplink transmission.

In yet another aspect, a computer program product is provided comprising a computer-readable storage medium storing executable instructions that, when executed by at least one processor, causes a wireless communication device to perform the actions of: receiving a report from user equipment in a wireless communication network characterizing total power headroom and antenna gain imbalance (AGI) for multiple uplink antennas of the user equipment; determining a power allocation scheme, a transmission rank and a precoding matrix in response to the report; and transmitting the power allocation scheme, the transmission rank and the precoding matrix to the user equipment for use for uplink transmission.

In yet an additional aspect, an apparatus is provided for transmit power control of uplink multiple antennas used in a wireless communication network, comprising receiving means for receiving a report for total power headroom and received Antenna Gain Imbalance (AGI) as received at user equipment in a wireless communication network. The apparatus further comprises determining means for determining a power allocation scheme, a transmission rank, and precoding matrix for the transmission rank uplink in response to the report; and transmitting means for transmitting the power allocation scheme, the transmission rank and the precoding matrix to the user equipment for use for uplink transmission.

In yet a further aspect, an apparatus is provided for transmit power control of uplink multiple antennas used in a wireless communication network. The apparatus comprises a memory holding instructions for receiving a report from user equipment in a wireless communication network characterizing total power headroom and AGI for multiple uplink antennas of the user equipment. The memory holds further instructions for determining a power allocation scheme, a transmission rank and a precoding matrix in response to the report. The memory holds further instructions for transmitting the power allocation scheme, the transmission rank and the precoding matrix to the user equipment for use for uplink transmission. The apparatus further comprises a processor that executes these instructions.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
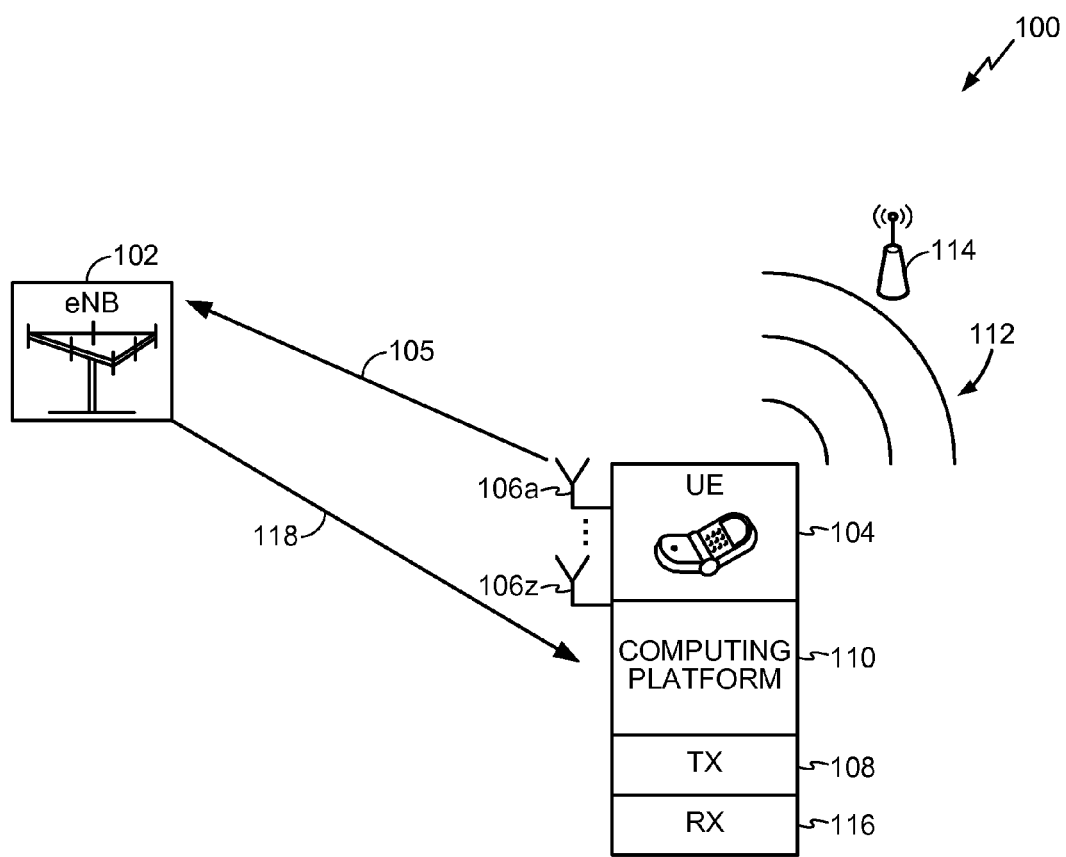
FIG. 1 illustrates a diagram of a Multiple Input Multiple Output (MIMO) communication system that benefits from transmit power control for an uplink across a plurality of transmit (Tx) antennas.

In FIG. 1, a Multiple Input Multiple Output (MIMO) communication system 100 between an evolved Node B (eNB) 102 and User Equipment (UE) 104 is illustrated. The communication system 100 may benefit from transmit power control for an uplink 105 across a plurality of transmit (Tx) antennas 106a-106z. In particular, a transmitter 108 of the UE 104 compensates for Antenna Gain Imbalance (AGI) via individual antenna control loops between the plurality of transmit antennas 106a-106z in response to a computing platform 110 determining that uplink transmit power is limited by interference 112 to a neighboring cell 114; i.e., is in an interference limited condition. In another instance, the transmitter 108 performs total power control loop for the plurality of transmit antennas 106a-106z in response to the computing platform 110 determining uplink transmit power is not limited by interference 112 to the neighboring cell 114; i.e., is not in an interference limited condition. A receiver (Rx) 116 of the UE 104 can receive information regarding the interference 112, such as from a downlink 118 from the eNB 102.

As used herein, "total power control" refers to using a unitary control loop to control total power conducted to multiple transmit antennas. Additional signaling is needed to perform AGI compensation. Total power control can be used to perform optimal power allocation; e.g., water-filling. Separate, dedicated power control loops may be used for individual antennas, for performing AGI.

Figure 2:
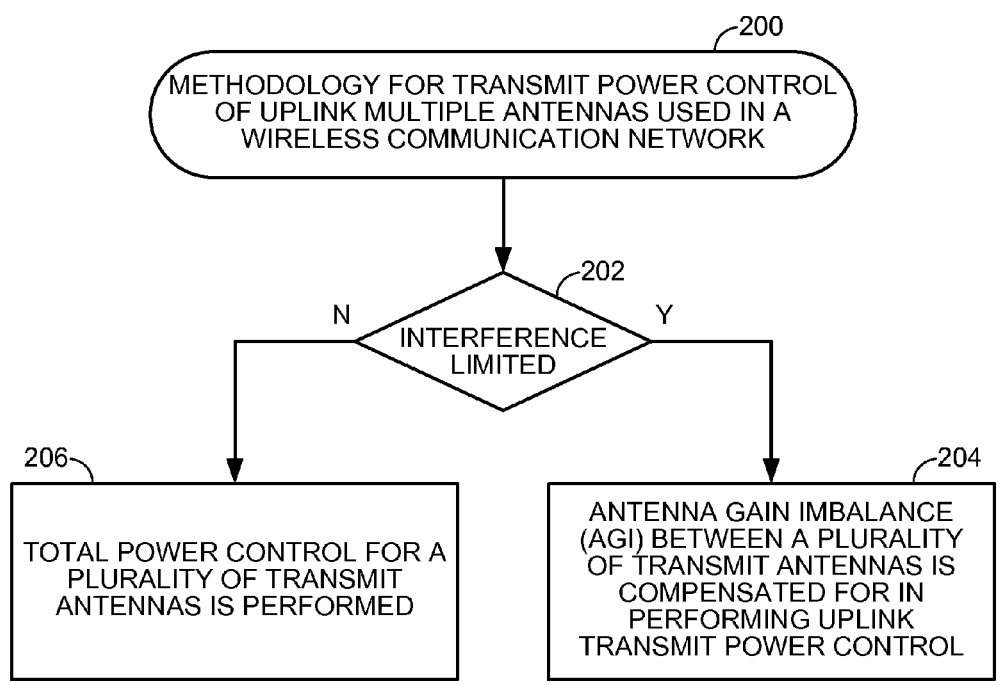
FIG. 2 illustrates a flow diagram of a methodology for transmit power control of uplink multiple antennas used in a wireless communication network.

In FIG. 2, a methodology 200 is provided for transmit power control of uplink multiple antennas used in a wireless communication network. If uplink power is interference limited (block 202), Antenna Gain Imbalance (AGI) between a plurality of transmit antennas is compensated for in performing uplink transmit power control (block 204). Otherwise, total power control for the plurality of transmit antennas is performed (block 206).

In some aspects the teachings herein may be employed in a network that includes macro scale coverage (e.g., a large area cellular network such as a 3G (Third Generation) networks, typically referred to as a macro cell network) and smaller scale coverage (e.g., a residence-based or building-based network environment). As an access terminal (AT) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Figure 3:
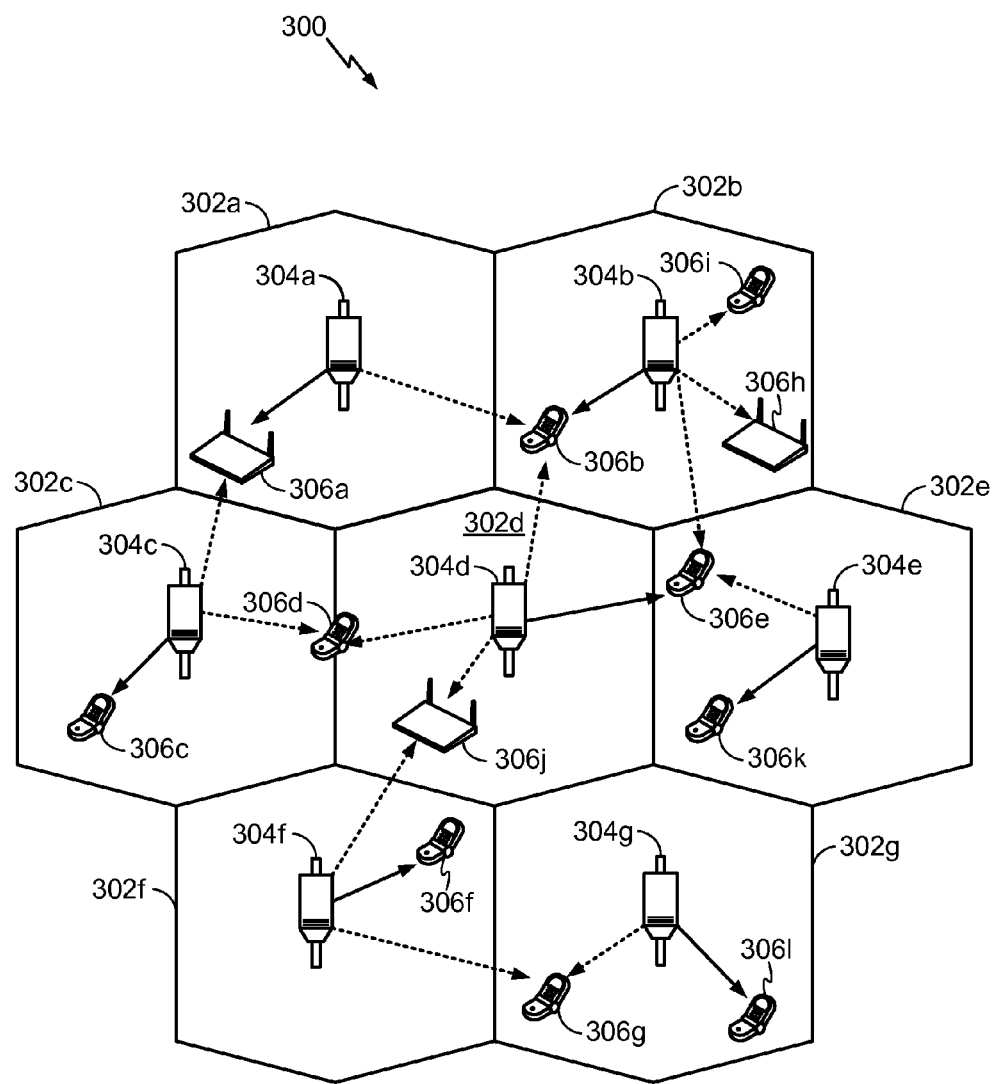
FIG. 3 illustrates a diagram of a wireless communication system configured to support a number of users.

FIG. 3 illustrates a wireless communication system 300, configured to support a number of users, in which the teachings disclosed herein may be implemented. The system 300 provides communication for multiple cells 302, such as, for example, macro cells 302a-302g, with each cell being serviced by a corresponding access node 304 (e.g., access nodes 304a-304g). As shown in FIG. 3, access terminals 306 (e.g., access terminals 306a-306l) may be dispersed at various locations throughout the system 300 over time. Each access terminal 306 may communicate with one or more access nodes 304 on a forward link (FL) and/or a reverse link (RL) at a given moment, depending upon whether the access terminal 306 is active and whether it is in soft handoff, for example. The wireless communication system 300 may provide service over a large geographic region. For example, macro cells 302a-302g may cover a few blocks in a neighborhood.

Figure 4:
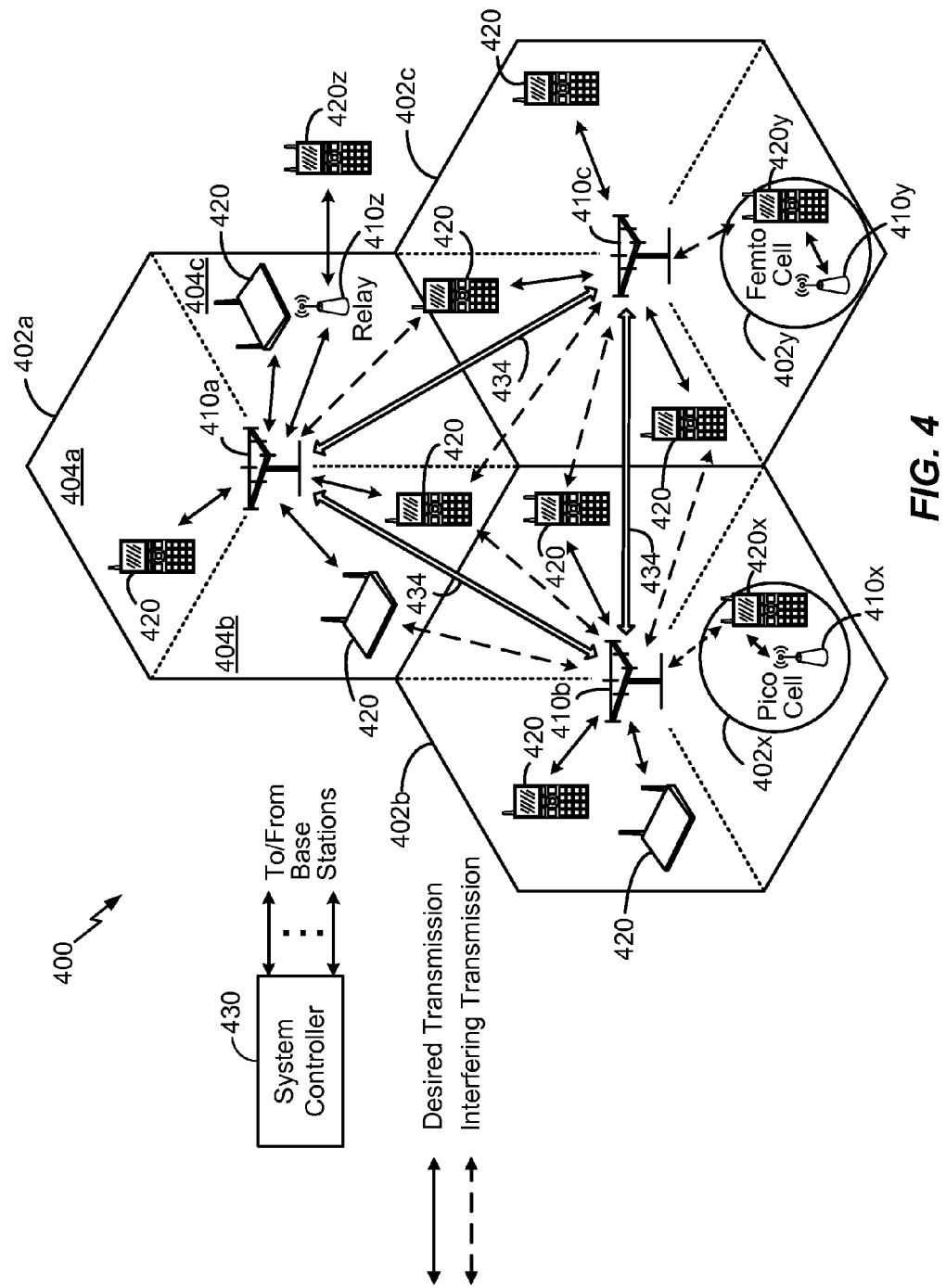
FIG. 4 illustrates a diagram of a wireless communication system comprising macro cells, femto cells and pico cells.

In the example shown in FIG. 4, a wireless network 400 may include base stations 410a, 410b and 410c such as macro base stations for macro cells 402a, 402b and 402c, respectively. Base station 410x may be a pico base station for a pico cell 402x communicating with terminal 420x. Base station 410y may be a femto base station for a femto cell 402y communicating with terminal 420y. Although not shown in FIG. 4 for simplicity, the macro cells may overlap at the edges. The pico and femto cells may be located within the macro cells (as shown in FIG. 4) or may overlap with macro cells and/or other cells.

Wireless network 400 may also include relay stations, e.g., a relay station 410z that communicates with terminal 420z. A relay station is a station that receives a transmission of data and/or other information from an upstream station and sends a transmission of the data and/or other information to a downstream station. The upstream station may be a base station, another relay station, or a terminal. The downstream station may be a terminal, another relay station, or a base station. A relay station may also be a terminal that relays transmissions for other terminals. A relay station may transmit and/or receive low reuse preambles. For example, a relay station may transmit a low reuse preamble in similar manner as a pico base station and may receive low reuse preambles in similar manner as a terminal.

A network controller 430 may be coupled to a set of base stations and provide coordination and control for these base stations. Network controller 430 may be a single network entity or a collection of network entities. Network controller 430 may communicate with base stations 410 via a backhaul. Backhaul network communication 434 can facilitate point-to-point communication between base stations 410a-410c employing such a distributed architecture. Base stations 410a-410c may also communicate with one another, e.g., directly or indirectly via wireless or wireline backhaul.

In other embodiments, wireless network 400 may be a homogeneous network that includes only macro base stations (not shown in FIG. 4). In the present example, wireless network 400 may be a heterogeneous network that includes base stations of different types, e.g., macro base stations, pico base stations, home base stations, relay stations, etc. These different types of base stations may have different transmit power levels, different coverage areas, and different impact on interference in wireless network 400. For example, macro base stations may have a high transmit power level (e.g., 20 Watts) whereas pico and femto base stations may have a low transmit power level (e.g., 9 Watts). The techniques described herein may be used for homogeneous and/or heterogeneous networks.

Terminals 420 may be dispersed throughout wireless network 400, and each terminal may be stationary or mobile. A terminal may also be referred to as an access terminal (AT), a mobile station (MS), user equipment (UE), a subscriber unit, or other suitable terminology. A terminal may be a cellular phone, a personal digital assistant (PDA), a wireless modem, a wireless communication device, a handheld device, a laptop computer, a netbook, a cordless phone, a wireless local loop (WLL) station, etc. A terminal may communicate with a base station via the downlink and uplink. The downlink (or forward link) refers to the communication link from the base station to the terminal, and the uplink (or reverse link) refers to the communication link from the terminal to the base station.

A terminal may be able to communicate with macro base stations, pico base stations, femto base stations, and/or other types of base stations. In FIG. 4, a solid line with double arrows indicates desired transmissions between a terminal and a serving base station, which is a base station designated to serve the terminal on the downlink and/or uplink. A dashed line with double arrows indicates interfering transmissions between a terminal and a base station. An interfering base station is a base station causing interference to a terminal on the downlink and/or observing interference from the terminal on the uplink.

Wireless network 400 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as a Global Positioning System (GPS).

In one aspect, to improve system capacity, the coverage area 402a, 402b, or 402c corresponding to a respective base station 410a-410c can be partitioned into multiple smaller areas 404a, 404b, and 404c. Each of the smaller areas 404a, 404b, and 404c can be served by a respective base transceiver subsystem (BTS, not shown). As used herein and generally in the art, the term "sector" can refer to a BTS and/or its coverage area depending on the context in which the term is used. In one example, sectors 404a, 404b, 404c in a cell 402a, 402b, 402c can be formed by groups of antennas (not shown) at base station 410, where each group of antennas is responsible for communication with terminals 420 in a portion of the cell 402a, 402b, or 402c. For example, a base station 410 serving cell 402a can have a first antenna group corresponding to sector 404a, a second antenna group corresponding to sector 404b, and a third antenna group corresponding to sector 404c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

Figure 5:
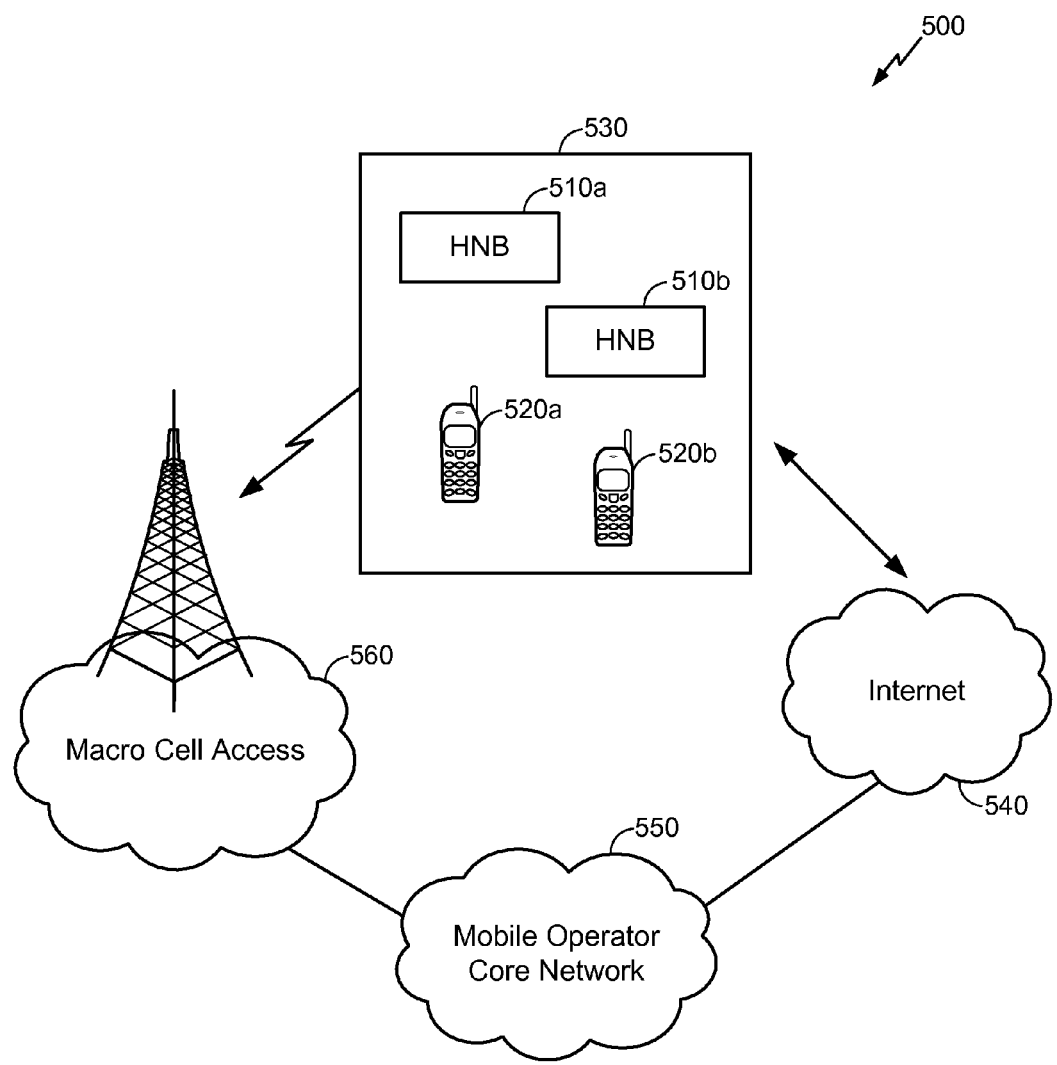
FIG. 5 illustrates a diagram of a communication system where one or more femto nodes are deployed within a network environment.

FIG. 5 illustrates an exemplary communication system 500 where one or more femto nodes are deployed within a network environment. Specifically, the system 500 may include multiple femto nodes 510 (e.g., femto nodes 510a and 510b) installed in a relatively small scale network environment (e.g., in one or more user residences 530). Each femto node 510 may be coupled to a wide area network 540 (e.g., the Internet) and a mobile operator core network 550 via a DSL router, a cable modem, a wireless link, or other connectivity means (not shown). As will be discussed below, each femto node 510 may be configured to serve associated access terminals 520 (e.g., access terminal 520a) and, optionally, alien access terminals 520 (e.g., access terminal 520b). In other words, access to femto nodes 510 may be restricted whereby a given access terminal 520 may be served by a set of designated (e.g., home) femto node(s) 510 but may not be served by any non-designated femto nodes (e.g., a neighbor's femto node).

Figure 6:
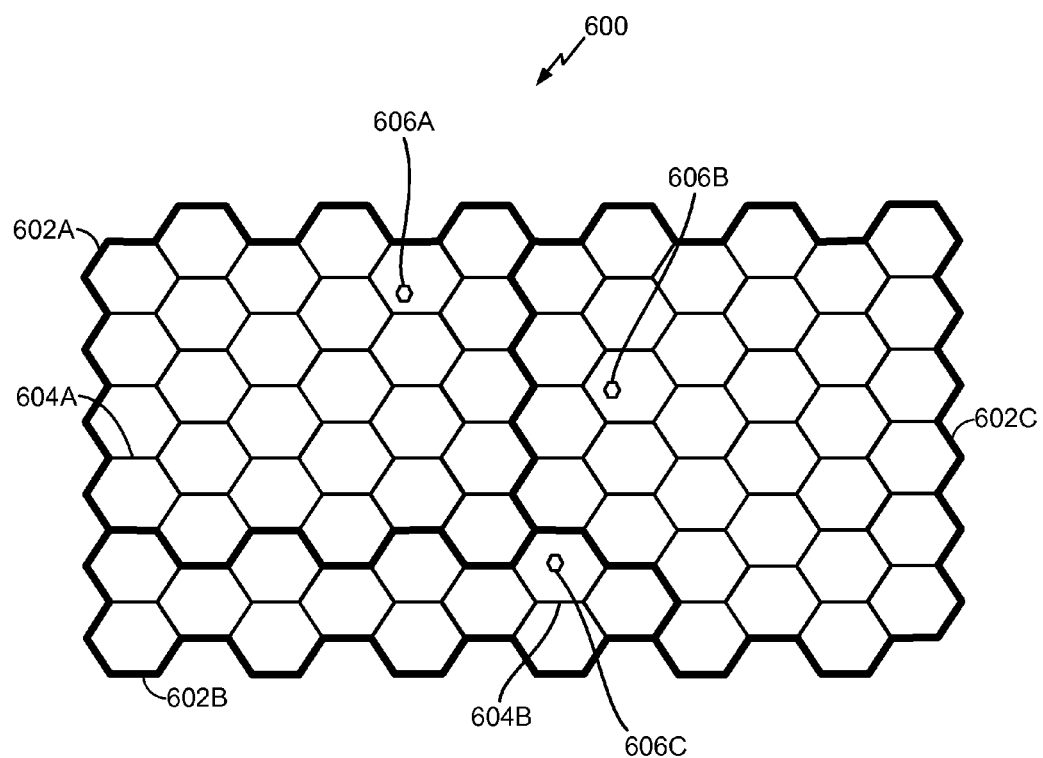
FIG. 6 illustrates a diagram of a coverage map where several tracking areas, routing areas or location areas are defined.

FIG. 6 illustrates an example of a coverage map 600 where several tracking areas 602 (or routing areas or location areas) are defined, each of which includes several macro coverage areas 604. In the present example, areas of coverage associated with tracking areas 602a, 602b, and 602c are delineated by the wide lines and the macro coverage areas 604 are represented by the hexagons. The tracking areas 602 also include femto coverage areas 606. In this example, each of the femto coverage areas 606 (e.g., femto coverage area 606c) is depicted within a macro coverage area 604 (e.g., macro coverage area 604b). It should be appreciated, however, that a femto coverage area 606 may not lie entirely within a macro coverage area 604. In practice, a large number of femto coverage areas 606 may be defined with a given tracking area 602 or macro coverage area 604. Also, one or more pico coverage areas (not shown) may be defined within a given tracking area 602 or macro coverage area 604.

Referring again to FIG. 5, the owner of a femto node 510 may subscribe to mobile service, such as, for example, 3G mobile service, offered through the mobile operator core network 550. In addition, an access terminal 520 may be capable of operating both in macro environments and in smaller scale (e.g., residential) network environments. In other words, depending on the current location of the access terminal 520, the access terminal 520 may be served by an access node 560 of the mobile operator core network 550 or by any one of a set of femto nodes 510 (e.g., the femto nodes 510a and 510b that reside within a corresponding user residence 530). For example, when a subscriber is outside his home, he is served by a standard macro access node (e.g., node 560) and when the subscriber is at home, he is served by a femto node (e.g., node 510a). Here, it should be appreciated that a femto node 510 may be backward compatible with existing access terminals 520.

A femto node 510 may be deployed on a single frequency or, in the alternative, on multiple frequencies. Depending on the particular configuration, the single frequency or one or more of the multiple frequencies may overlap with one or more frequencies used by a macro node (e.g., node 560).

In some aspects, an access terminal 520 may be configured to connect to a preferred femto node (e.g., the home femto node of the access terminal 520) whenever such connectivity is possible. For example, whenever the access terminal 520 is within the user's residence 530, it may be desired that the access terminal 520 communicate only with the home femto node 510.

In some aspects, if the access terminal 520 operates within the mobile operator core network 550 but is not residing on its most preferred network (e.g., as defined in a preferred roaming list), the access terminal 520 may continue to search for the most preferred network (e.g., the preferred femto node 510) using a Better System Reselection (BSR), which may involve a periodic scanning of available systems to determine whether better systems are currently available, and subsequent efforts to associate with such preferred systems. With the acquisition entry, the access terminal 520 may limit the search for specific band and channel. For example, the search for the most preferred system may be repeated periodically. Upon discovery of a preferred femto node 510, the access terminal 520 selects the femto node 510 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 510 that reside within the corresponding user residence 530). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO) system, a multiple-in-multiple-out (MIMO) system, or some other type of system.

Figure 7:
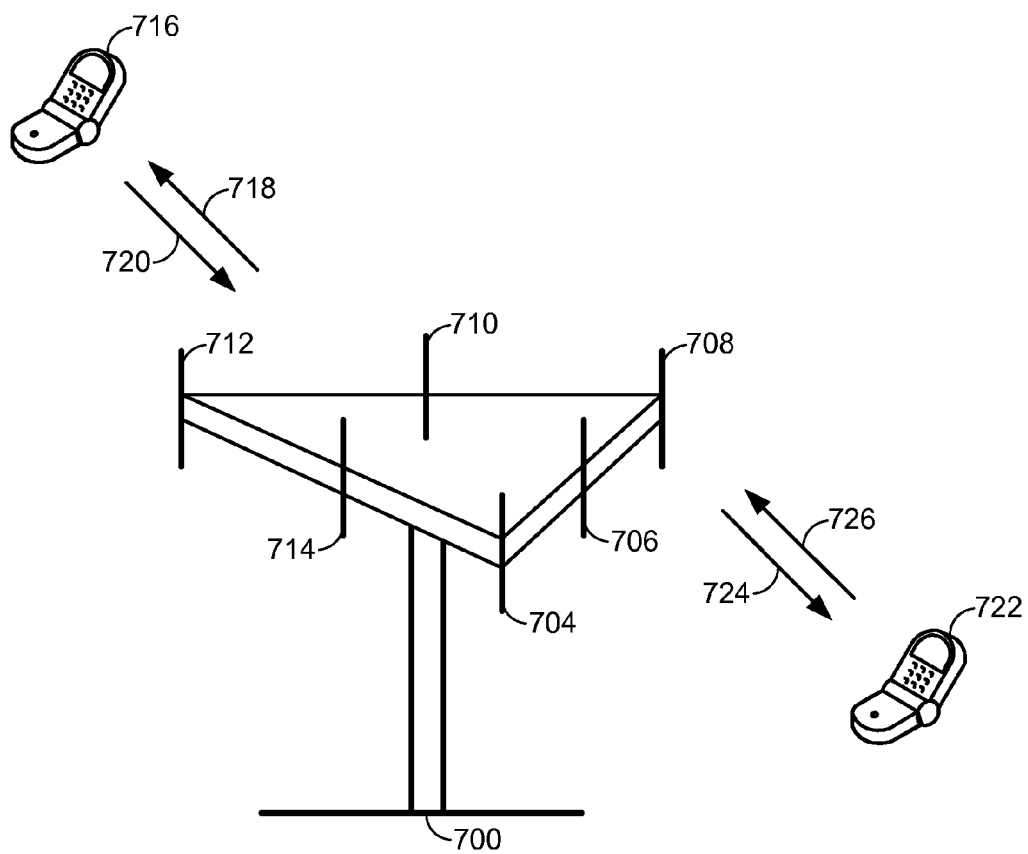
FIG. 7 illustrates a diagram of a multiple access wireless communication system.

Referring to FIG. 7, a multiple access wireless communication system according to one aspect is illustrated. An access point (AP) 700 includes multiple antenna groups, one including 707 and 706, another including 708 and 710, and an additional including 712 and 714. In FIG. 7, only two antennas are shown for each antenna group, however, more or fewer antennas may be utilized for each antenna group. Access terminal (AT) 716 is in communication with antennas 712 and 714, where antennas 712 and 714 transmit information to access terminal 716 over forward link (or downlink) 720 and receive information from access terminal 716 over reverse link (or uplink) 718. Access terminal 722 is in communication with antennas 706 and 708, where antennas 706 and 708 transmit information to access terminal 722 over forward link (or downlink) 726 and receive information from access terminal 722 over reverse link (or uplink) 724. In a FDD system, communication links 718, 720, 724 and 726 may use different frequencies for communication. For example, forward link 720 may use a different frequency then that used by reverse link 718.

Each group of antennas and/or the area in which they are designed to communicate is often referred to as a sector of the access point. In the aspect, antenna groups each are designed to communicate to access terminals in a sector, of the areas covered by access point 700.

In communication over forward links 720 and 726, the transmitting antennas of access point 700 may utilize beamforming in order to improve the signal-to-noise ratio of forward links for the different access terminals 716 and 722. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, an Node B, an evolved Node B (eNB), or some other terminology. An access terminal may also be called a user equipment (UE), a mobile device, wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region such that the reciprocity principle allows the estimation of the forward link channel from the reverse link channel. This enables the access point to extract transmit beam-forming gain on the forward link when multiple antennas are available at the access point.

Figure 8:
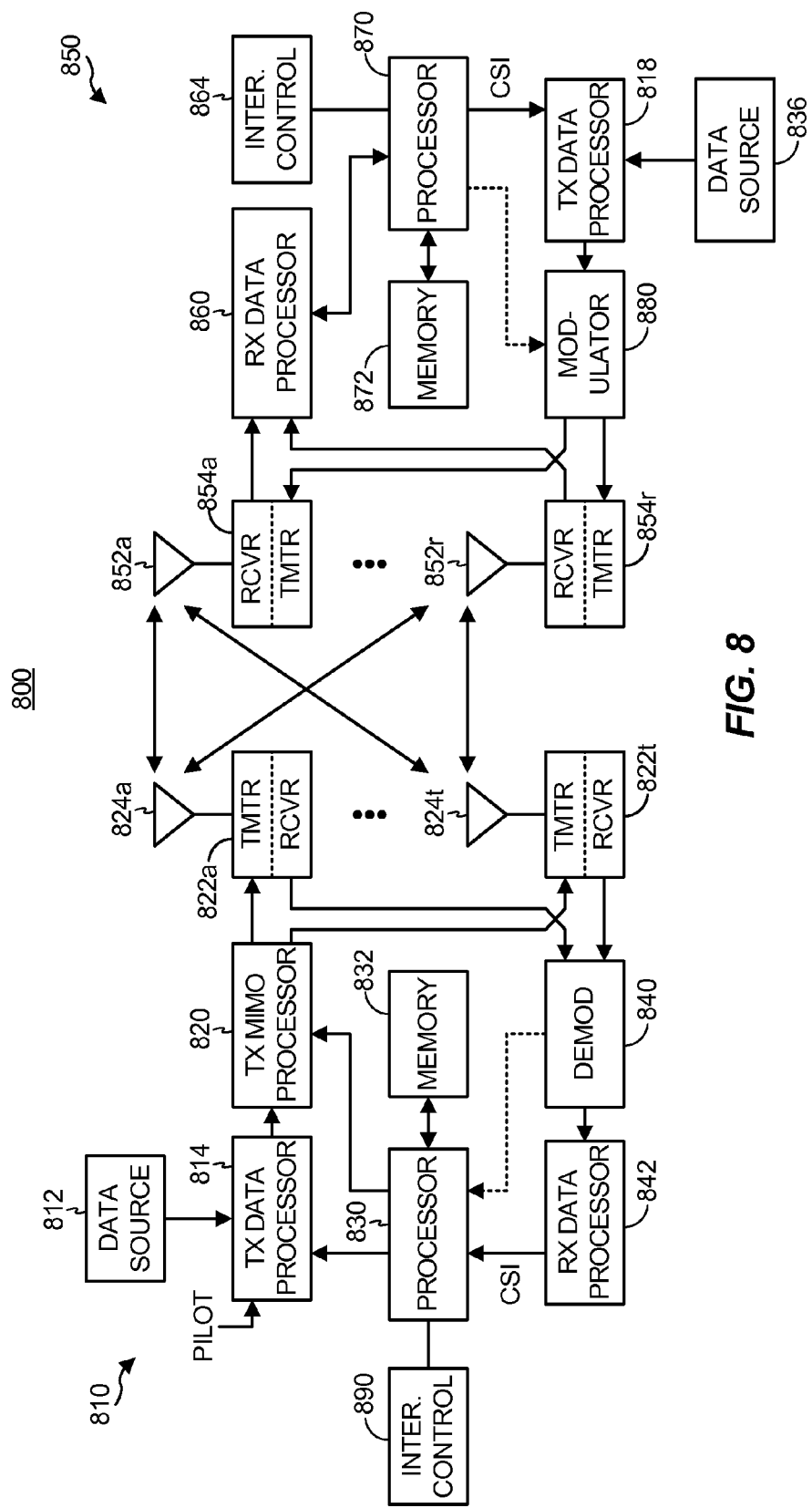
FIG. 8 illustrates a schematic of a multiple input multiple output (MIMO) communication system.

The teachings herein may be incorporated into a node employing various components for communicating with at least one other node. FIG. 8 illustrates several sample components that may be employed to facilitate communication between nodes. Specifically, FIG. 8 illustrates a wireless device 810 (e.g., an access point) and a wireless device 850 (e.g., an access terminal or UE) of a MIMO system 800. At the device 810, traffic data for a number of data streams is provided from a data source 812 to a transmit (TX) data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., Binary Phase Shift Keying (BPSK), Quadrature Phase Shift Keying (QSPK), M-ary Phase Shift Keying (M-PSK), or Multi-Level Quadrature Amplitude Modulation (M-QAM)) selected for that data stream to provide modulation symbols. The data rate, coding, and modulation for each data stream may be determined by instructions performed by a processor 830. A data memory 832 may store program code, data, and other information used by the processor 830 or other components of the device 810.

The modulation symbols for all data streams are then provided to a TX MIMO processor 820, which may further process the modulation symbols (e.g., for Orthogonal Frequency-Division Multiplexing (OFDM)). The TX MIMO processor 820 then provides $N_T$ modulation symbol streams to $N_T$ transceivers 822a through 822t that each has a transmitter (TMTR) and receiver (RCVR). In some aspects, the TX MIMO processor 820 applies beamforming weights to the symbols of the data streams and to the antenna from which the symbol is being transmitted.

Each transceiver 822a-822t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822a through 822t are then transmitted from $N_T$ antennas 824a through 824t, respectively.

At the device 850, the transmitted modulated signals are received by $N_R$ antennas 852a through 852r and the received signal from each antenna 852a-852r is provided to a respective transceiver 854a through 854r which has a receiver (RCVR) and a transmitter (TMTR). Each transceiver 854a-854r conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854a-854r based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which pre-coding matrix to use. The processor 870 formulates a reverse link message comprising a matrix index portion and a rank value portion. A data memory 872 may store program code, data, and other information used by the processor 870 or other components of the device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854a through 854r, and transmitted back to the device 810.

At the device 810, the modulated signals from the device 850 are received by the antennas 824a-824t, conditioned by the transceivers 822a-822t, demodulated by a demodulator (DEMOD) 840, and processed by a RX data processor 842 to extract the reverse link message transmitted by the device 850. The processor 830 then determines which pre-coding matrix to use for determining the beam-forming weights then processes the extracted message.

FIG. 8 also illustrates that the communication components may include one or more components that perform interference control operations. For example, an interference (INTER) control component 890 may cooperate with the processor 830 and/or other components of the device 810 to send/receive signals to/from another device (e.g., device 850). Similarly, an interference control component 892 may cooperate with the processor 870 and/or other components of the device 850 to send/receive signals to/from another device (e.g., device 810). It should be appreciated that for each device 810 and 850 the functionality of two or more of the described components may be provided by a single component. For example, a single processing component may provide the functionality of the interference control component 890 and the processor 830 and a single processing component may provide the functionality of the interference control component 892 and the processor 870.

Figure 9:
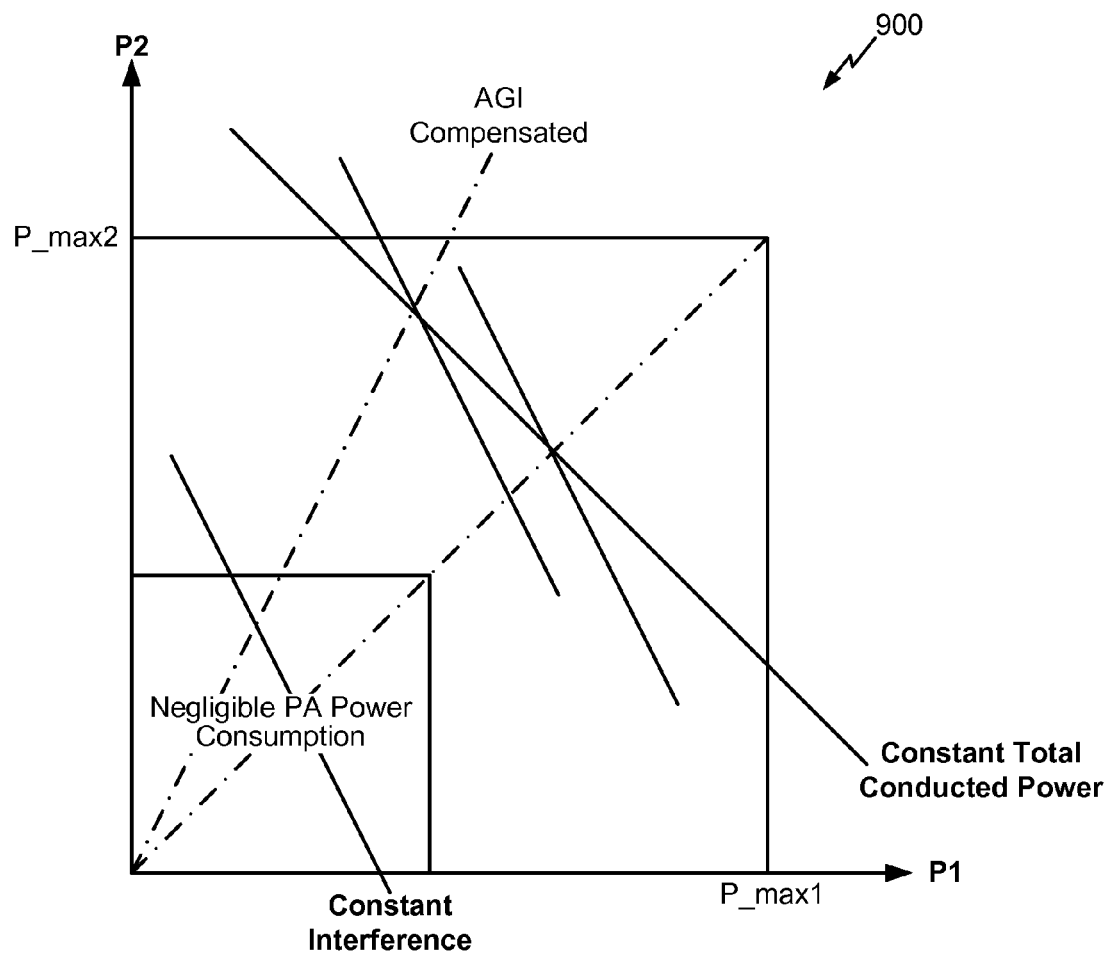
FIG. 9 illustrates a graphical plot of a power control relationship in an uplink MIMO system.

In FIG. 9, a power control relationship 900 is depicted for an uplink (UL) MIMO power control problem, which shows the amount of interference to other cells generated could be different with different power control schemes maintaining the same total conducted power. For example, consider an UL power control problem abstraction, as follows. A simple model to describe the generic power control scenario can be given by:

$$\max C(P_1, P_2, I_o)$$

$$\text{s.t. } P_1 + P_2 \leq P_{tot}$$

$$P_1 \leq P_{max1}, P_2 \leq P_{max2}$$

$$Io = f(P_1, P_2)$$

where C refers to power control function, $P_1$ refers to Tx conducted power for a first antenna, $P_2$ refers to Tx conducted power for a second antenna, "s.t." denotes subject to, $P_{tot}$ refers to total Tx power, $P_{max1}$ and $P_{max2}$ refer to maximum limits on $P_1$ and $P_2$, respectively, and $I_o$ refers to the level of interference seen.

An effective solution to a generic optimization problem may obtain optimal link performance given the current power control setting. Interference injected into the system may also be considered. Battery efficiency may also be modeled.

More specialized optimization problems may be directed to different goals. For example, an objective power control function for a Physical Uplink Shared Channel (PUSCH) may be directed to maximizing average link capacity. For further example, an objective power control function for a Physical Uplink Control Channel (PUCCH) may be directed to minimizing the average block error rate (BLER). In the uplink, power control may be used both for inter-cell interference control and for intra-cell link adaptation.

Figure 10:
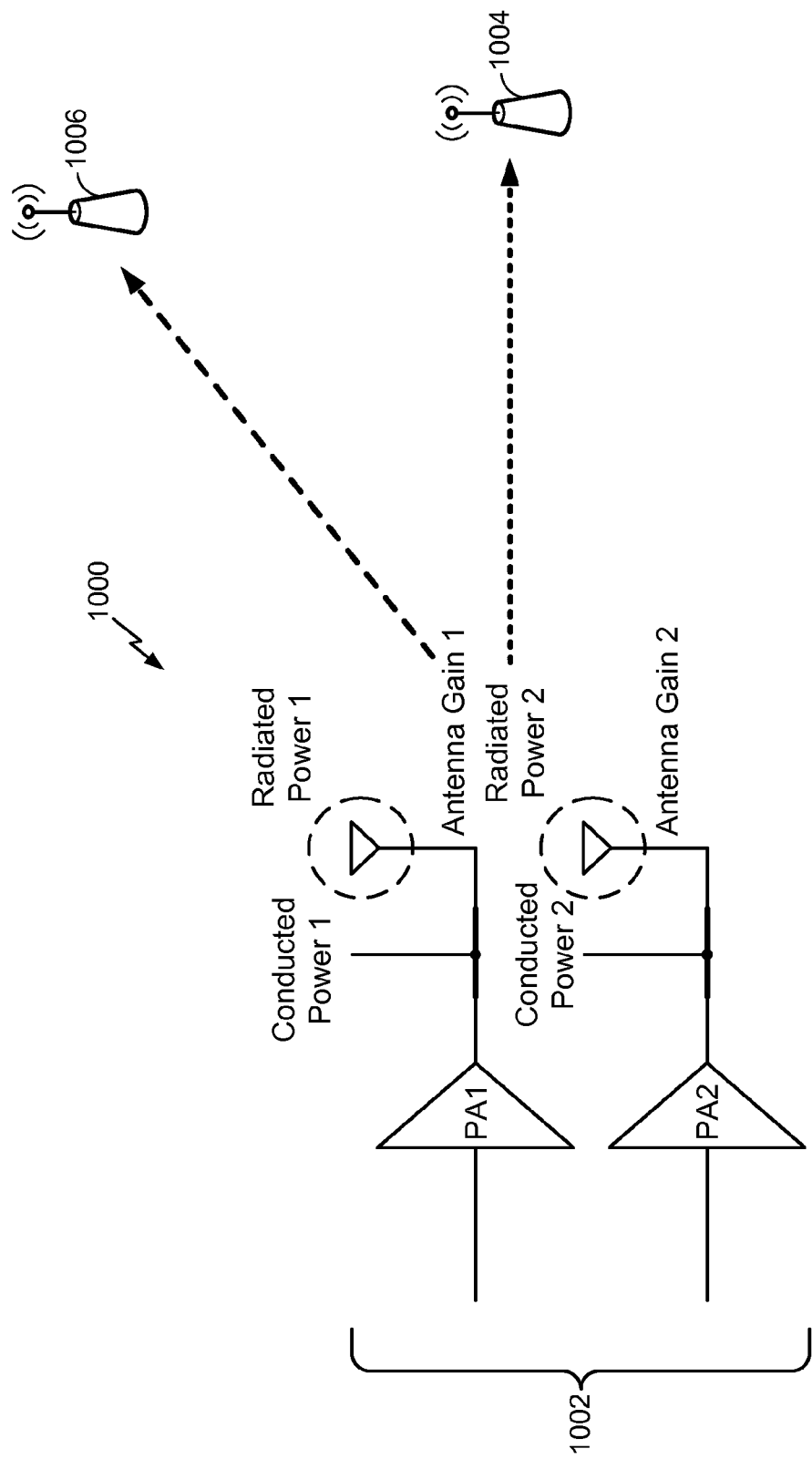
FIG. 10 illustrates a diagram of a power control scenario for an interference-limited network.

In FIG. 10, a power control scenario for an interference-limited network 1000 is depicted. UE 1002 typically transmits at low power to a serving cell 1004. Interference to other cells 1006 should be controlled tightly. It should be appreciated with the benefit of the present disclosure that total radiated power control is of interest. Balanced radiated power, that is, balanced Rx Signal-to-Interference-plus-Noise Ratio (SINR), can be shown to achieve the best performance when open-loop diversity or closed-loop spatial multiplexing is exploited.

A simple model to describe the power control in interference limited scenario can be given by:

$$\max C(P_1, P_2, I_o)$$

$$\text{s.t. } P_1 + P_2 \leq P_{tot}$$

$$P_1 \leq P_{max1}$$

$$P_2 \leq P_{max2}$$

$$I_o \propto P_1 + \alpha P_2$$

where the symbols are interpreted as described above for generic power control, and $\alpha$ refers to a power control coefficient. Interference ($I_o$) is proportional to $P_1 + \alpha P_2$. Notably, total received (Rx) Signal-to-Noise Ratio (SINR) will be constant when the interference limited condition applies. When operating under an interference limited condition, the UE should transmit at relatively low power levels to limit interference with a neighboring cell.

Figure 11:
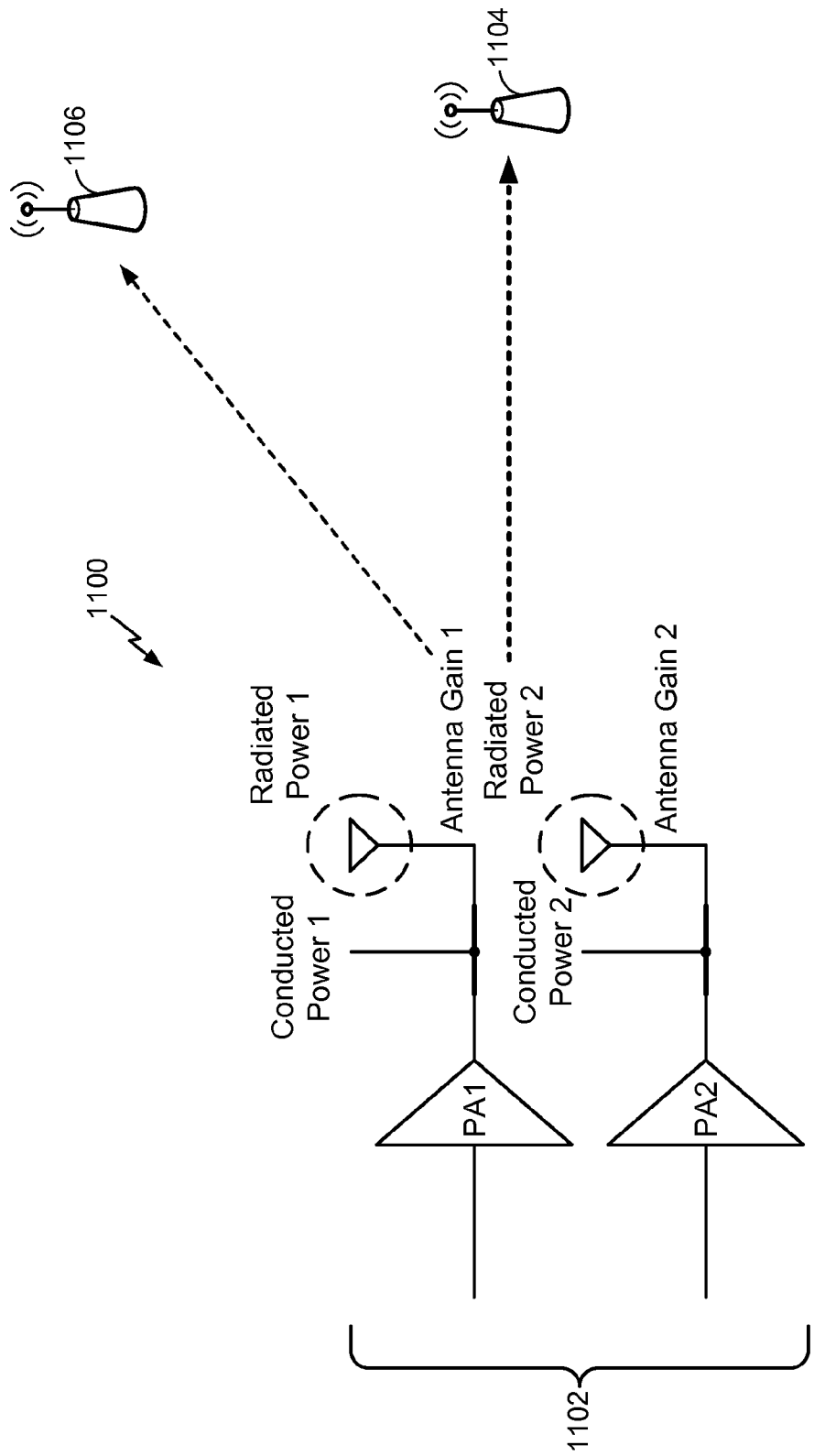
FIG. 11 illustrates power control scenario for a non-interference-limited network

In FIG. 11, a power control scenario for a network 1100 is depicted, under a condition in which uplink power is not limited by interference. The UE 1102 transmits at an efficient use of total conducted power to a serving cell 1104. Interference to other cells 1106 is small and thus does not limit transmit power. Under this condition, transmit power control may be controlled to tradeoff between link capacity and Power Amplifier (PA) efficiency. Under conditions where the uplink transmit power is not limited by interference, compensation for AGI is not necessarily the optimal strategy to be performed.

The serving cell 1104 may signal the optimal power allocation to the UE 1102, for example using two bits of quantization as a baseline for performance evaluation. Power allocation may be signaled to a UE with two transmit antennas, for example, as any one of the coordinate pairs [0.7, 0.3], [0.5, 0.5], [0.3, 0.7], [0.1, 0.9], wherein the first number of the pair indicates the proportion of power directed to the first transmit antenna, and the second number indicates the proportion of power directed to the second transmit antenna.

A simple model to describe the power control in non-interference limited scenario can be given by:

$$\max C(P_1, P_2, I_o)$$

$$\text{s.t. } P_1 + P_2 \leq P_{tot}$$

$$P_1 \leq P_{max1}$$

$$P_2 \leq P_{max2}$$

$$I_o = \text{constant}$$

where the symbols are interpreted as described above for the generic power control and interference-limited control scenarios. Notably, interference and total Transmit (Tx) SINR can be constant.

In order to support total transmit power control and eNB-signaled power control schemes, the UE 1002, 1102 can include individual antenna power control where each Tx antenna has its own power control loop, which can thus support AGI compensation. For total power control, as is an emphasis of the disclosure that follows, a power control loop controls the total conducted power. Additional signaling is used to do AGI compensation. Optimal power allocation can also be performed, such as by "water-filling."

Power control can be performed at the UE in response to control signals from the base station, eNB or cell. The base station may therefore determine how power control is performed at the UE.

Figure 12:
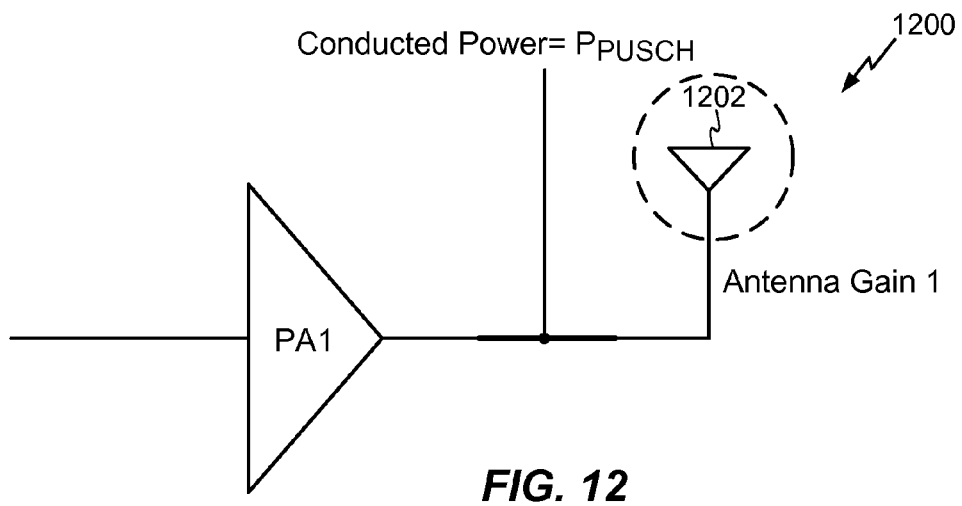
FIG. 12 illustrates a diagram of single antenna user equipment (UE) performing Physical Uplink Shared Channel (PUSCH) power control.

PUSCH/SRS Power Control: For comparison in FIG. 12, consider a single antenna UE 1200 performing 3GPP LTE (Rel. 8) Physical Uplink Shared Channel (PUSCH) power control. UE PUSCH Tx Power may be defined as:

$$P_{PUSCH}(i) = \min\{P_{CMAX}, 10\log_{10}(M_{PUSCH}(i) + P_{O\_PUSCH}(j) + \alpha(j) \cdot PL + \Delta_{TF}(i) + f(i)\},$$

where $P_{cmax}$ refers to the maximum allowed power depending on the UE class; $M_{PUSCH}(i)$ refers to the number of assigned resource blocks as indicated in the uplink grant; $P_{O\_PUSCH}(j)$ refers to a UE-specific parameter; $\alpha(j)$ refers to a cell-specific path loss compensation factor having 8 values from 0.4 to 1 in steps of 0.1 and zero; PL refers to downlink path loss calculated in the UE from a reference signal received power (RSRP) measurement and signaled reference signal transmit power; $\Delta_{TF}(i)$ refers to a value signaled in radio resource control (RRC); and f(i) refers to a UE specific correction value that is defined in response to scheduling.

Power headroom (PH) may be defined as the difference between $P_{cmax}$ and $P_{PUSCH}$. Power headroom reporting from the UE may be used to provide the serving eNB with the information about the UE Tx power, as follows:

$$PH(i) = P_{CMAX} - \{10\log_{10}(M_{PUSCH}(i)) + P_{O\_PUSCH}(j) + \alpha(j) \cdot PL + \Delta_{TF}(i) + f(i)\},$$

where symbols are defined as above.

Since there is a single transmit antenna 1202, total power is conducted to that Tx antenna 1202 without the choices afforded by multiple Tx antennas.

Power control for Sounding Reference Signal (SRS) (wideband channel sounding, also called Broadband Pilot Channel (BPICH)) can follow PUSCH as follows:

$$P_{SRS}(i) = \min\{P_{CMAX}, P_{SRS\_OFFSET} + 10\log_{10}(M_{SRS}) + P_{O\_PUSCH}(j) + \alpha(j) \cdot PL + f(i)\},$$

where symbol conventions follow use in the preceding equations.

Figure 13:
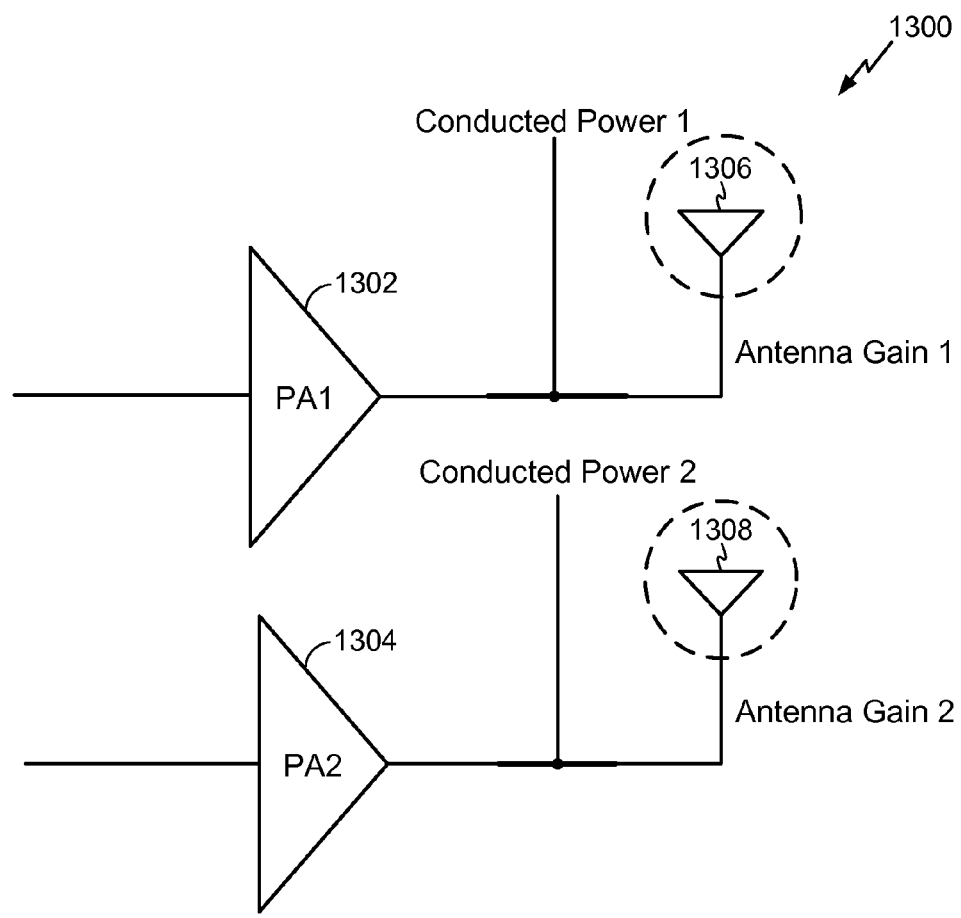
FIG. 13 illustrates a diagram of a multiple transmit antenna UE performing PUSCH power control.

In FIG. 13, a multiple transmit antenna UE 1300 is depicted performing PUSCH power control in LTE Advanced (LTE-A) with corresponding Power Amplifiers (PAs) 1302, 1304 with differing antenna gain to respective Tx antennas 1306, 1308. In the presence of AGI where gain of Tx antenna '2' 1308 is 'X' times gain of Tx antenna '1' 1306, wherein 0<X<1, assume the two channels from the two Tx antennas 1306, 1308 are orthogonal and the uplink transmission is not interference-limited, so optimal power allocation can be achieved by water-filling. For instance, more power is put on Tx antenna '1' 1306, less power on Tx antenna '2' 1308. Thus, when 'X' is very small, all power can be put onto Tx antenna '1' 1306, which is almost optimal. Power allocation to mitigate the AGI could conceivably be attempted providing less power on Tx antenna '1' 1306 and more power on Tx antenna '2' 1308; however, this may not be deemed to be a good approach.

Figure 14:
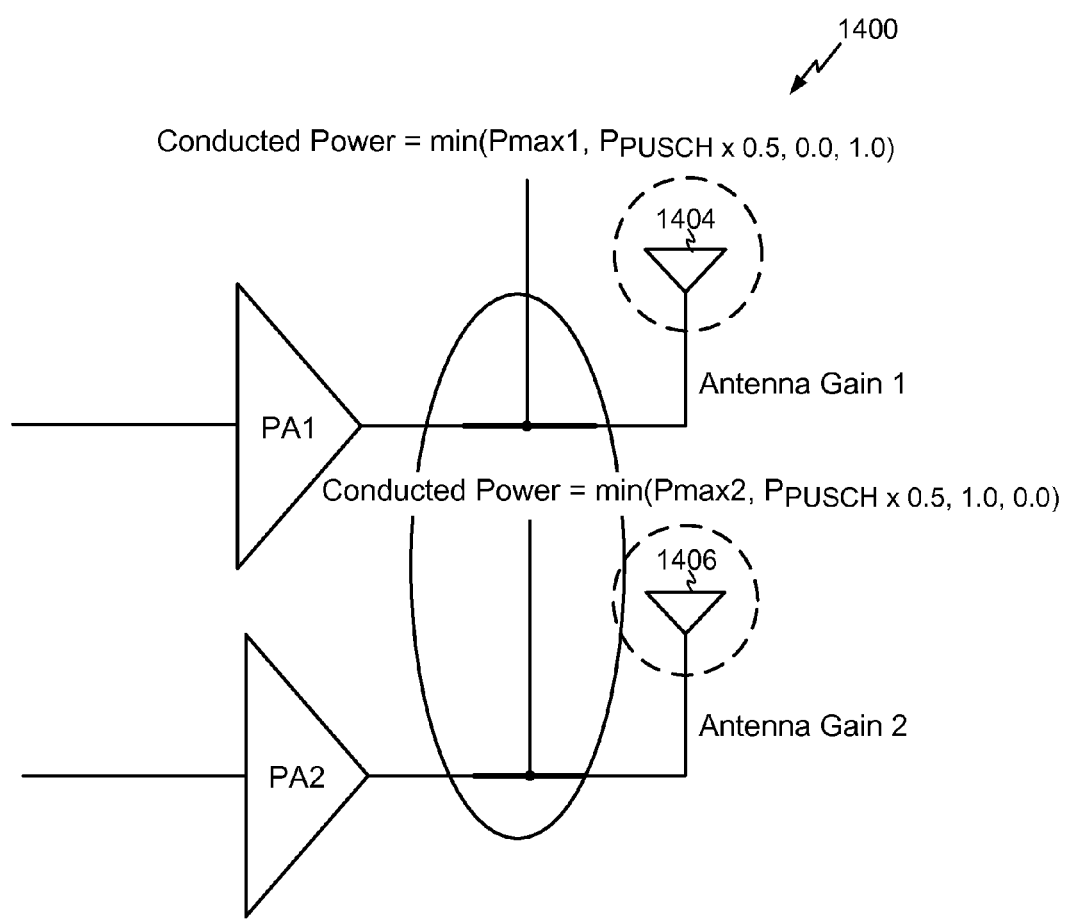
FIG. 14 illustrates a diagram of a multiple transmit antenna UE performing total power control.

In FIG. 14, a multiple Tx antenna UE 1400 performs total power control as depicted by controlling total conducted power:

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\},$$

where PL could be the DL path loss estimate of at one of the receive antennas when AGI is measurably non-zero, or the average of the path loss estimates over all the receive antennas when AGI is not measurably non-zero. Power allocation among the transmit antennas may be, for examples: a default power allocation (0.5, 0.5) signifying that both Tx antennas 1404, 1406 are active; (0.0, 1.0) signifying that only PA 2 (not shown) for Tx antenna '2' 1406 is active, or (1.0, 0.0) signifying that only PA 1 (not shown) for Tx antenna '1' 1404 is active.

An additional power allocation scheme may be signaled by eNB dynamically, such as by using the L2 layer in the downlink control information (DCI) for UL MIMO or modify 3/3A format for group notification; or semi-statically such as by using the L3 signaling via Physical Downlink Shared Channel (PDSCH). For example, a two-bit codebook can be used such as (0.7, 0.3), (0.5, 0.5), (0.3, 0.7), (0.2, 0.8), where each vector indicates proportions of power allocated to each transmit antenna.

More generally, conducted power for a Tx antenna p in LTE-A may be computed as:

$$P_{PUSCH,Tx-p}(i) = \min\{P_{MAX,Tx-p}, \eta(p) \cdot P_{PUSCH}(i)\} \; p = 0, 1, \ldots, N_T-1$$

where $[\eta(0), \eta(1), \ldots, \eta(N_T-1)]^T$ is the signaled power allocation vector which satisfies:

$$\sum_{p=0}^{N_T-1} \eta(p) = 1,$$

as illustrated by the foregoing example.

In this aspect, power headroom report can be as described for the single-antenna (Rel. 8) case above, as pertaining to headroom for the total power across all antennas. In addition, the UE may report the Rx Path loss of each antenna from serving eNB and interfering neighboring eNBs to the serving eNB, via L3 signaling or other means. Such reports may be used at the eNBs for estimation of Tx AGI at the serving eNB and inform the serving eNB about the level of interference that would be injected by the UE to neighboring eNBs by an uplink transmission. Thus, the eNB may use the reported information for power control signaling to the UE.

In an aspect, control of the transmission power of an SRS from Tx antenna-p may be performed using one of two options. According to a first option, control of sounding power is performed for one Tx antenna at one time, wherein SRS follows total PUSCH power as follows:

$$P_{SRS,Tx-p}(i) = \min\{P_{max-p}, P_{SRS\_OFFSET} + 10 \log_{10}(M_{SRS}) + P_{O\_PUSCH}(j) + \alpha(j) \cdot PL + f(i)\}.$$

According to a second option, control of sounding power is performed for more than one (i.e., $N_{active}$ antennas) Tx antenna at one time using equal power splitting, as follows:

$$P_{SRS,Tx-p}(i) = \min\{P_{max,p}, P_{SRS\_OFFSET} + 10 \log_{10}(M_{SRS}) + P_{O\_PUSCH}(j) + \alpha(j) \cdot PL + f(i) - 10 \log_{10}(N_{active})\}$$

eNB scheduling may be performed according to the reported power headroom, selecting the optimal transmission rank and the best precoding matrix for that rank under a particular power allocation scheme. Those antenna selection vectors should be normalized and be treated as special precoding vectors.

Figure 15:
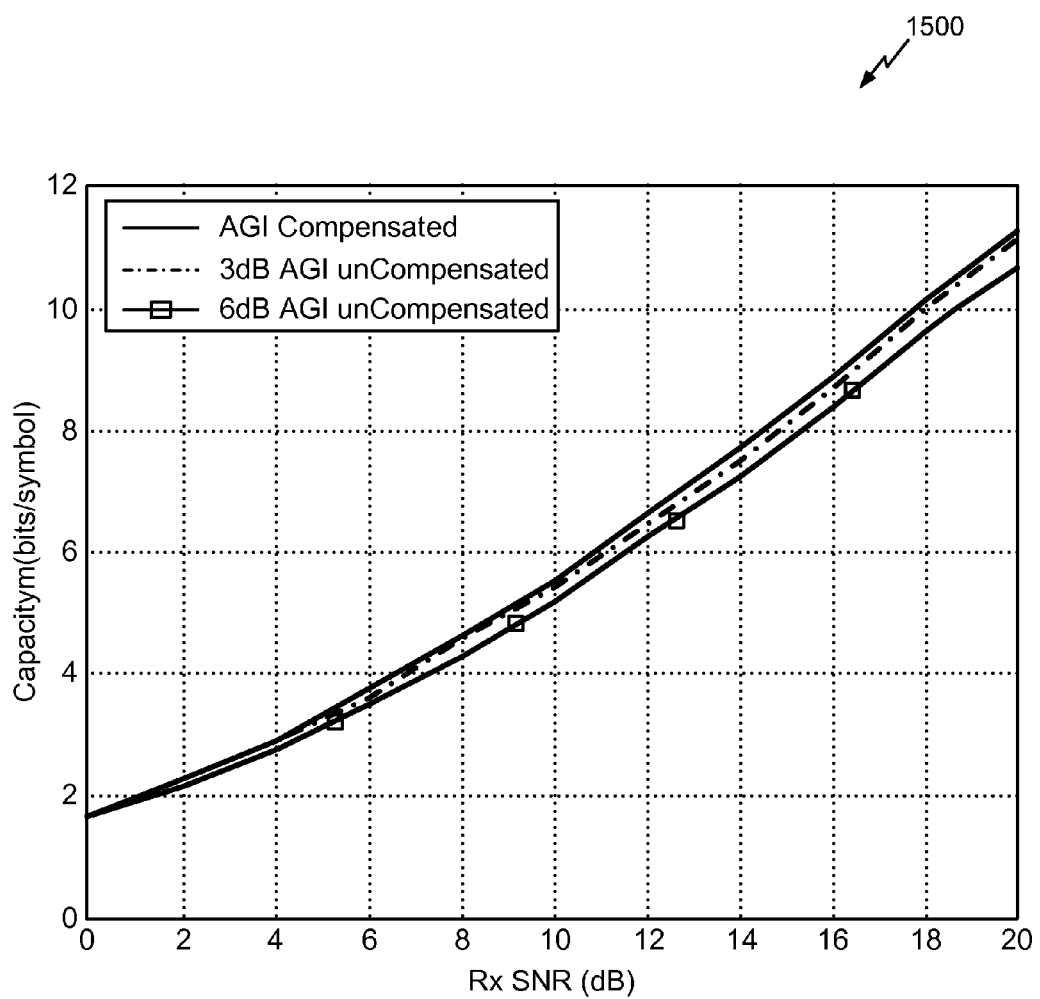
FIG. 15 illustrates a graphical plot of capacity comparison for an interference-limited power allocation for rank-2 transmission.

In FIG. 15, a graphical capacity comparison 1500 is depicted for an interference-limited power allocation for rank-2 transmission wherein the X-axis is total Rx SINR. It can be observed that compensating AGI yields the largest capacity.

Figure 16:
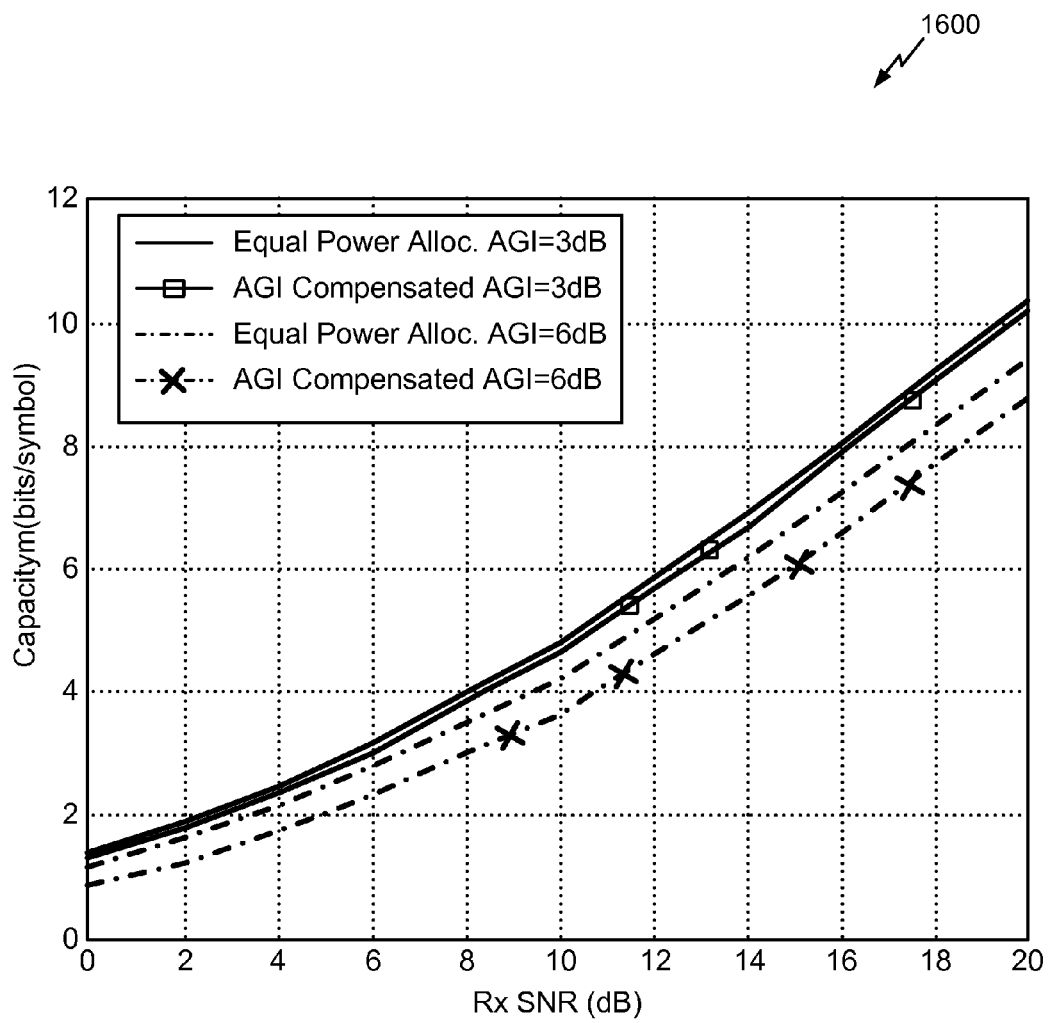
FIG. 16 illustrates a graphical plot of capacity comparison for a non-interference-limited power allocation for rank-2 transmission.

In FIG. 16, a graphical capacity comparison 1600 is depicted for a non-interference-limited power allocation for rank-2 transmission wherein the X-axis is total Rx SINR. It can be observed that compensating AGI yields a loss of capacity and could result in more battery power consumption at the UE.

Figure 17:
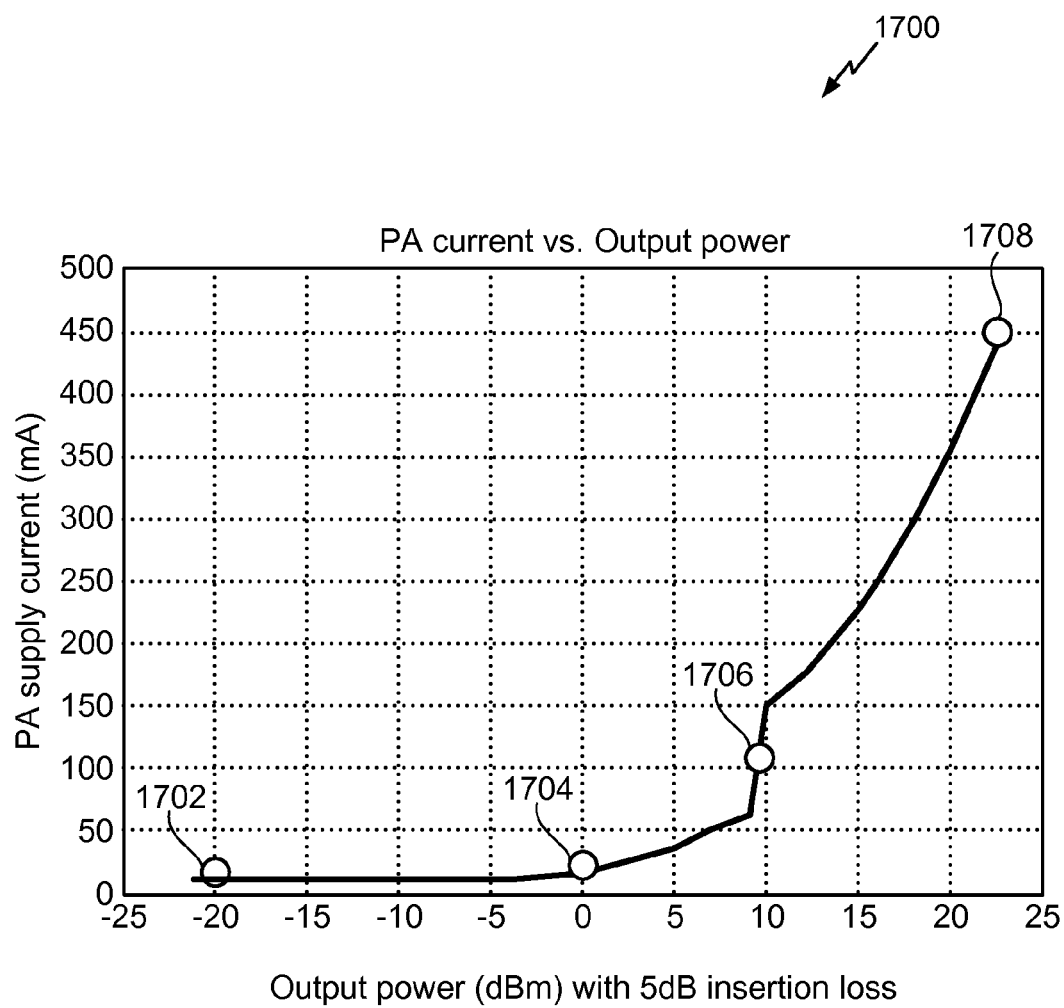
FIG. 17 illustrates a graphical plot for an exemplary Power Amplifier (PA) efficiency curve.

In some embodiments, the UE may report the operating efficiency of its PAs to the serving eNB. The eNB may use PA operating efficiency information in determining scheduling at the serving eNB for greater UE power consumption efficiency. For example, the UE may optionally report its own PA efficiency characteristics if the UE is operating close to its maximum. The UE need not report detailed characteristics; for example, only a few key switching points in the PA efficiency curve may be reported, instead of the entire efficiency curve. For example, FIG. 17 shows a graphical plot 1700 for an exemplary Power Amplifier (PA) efficiency curve. Reporting selected points, for example, points 1702, 1704, 1706 and 1708 may provide sufficient information for power control.

Figure 18:
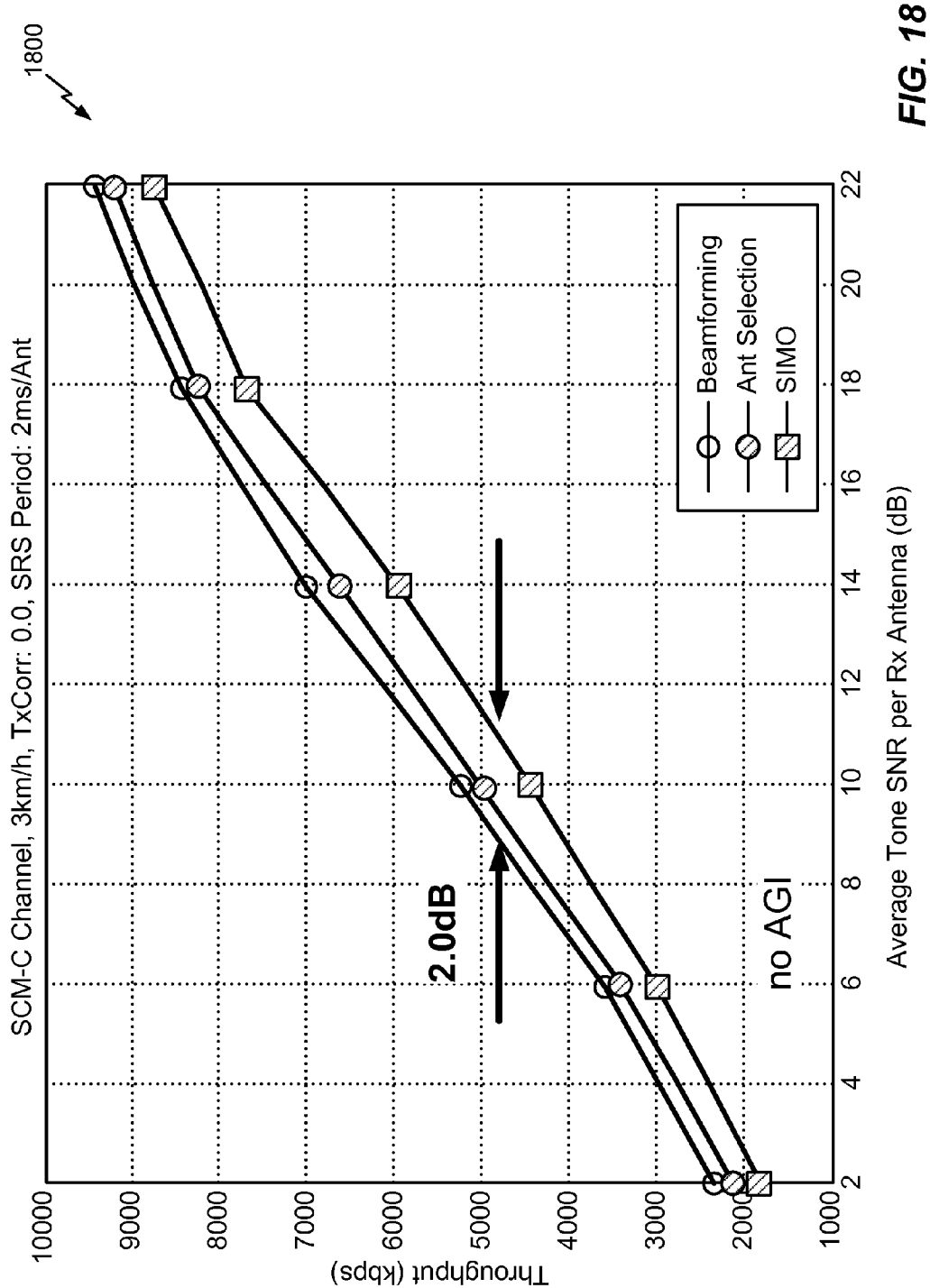
FIG. 18 illustrates a graphical plot of capacity comparison for a non-interference-limited power allocation for rank-1 transmission without Antenna Gain Imbalance (AGI).
Figure 19:
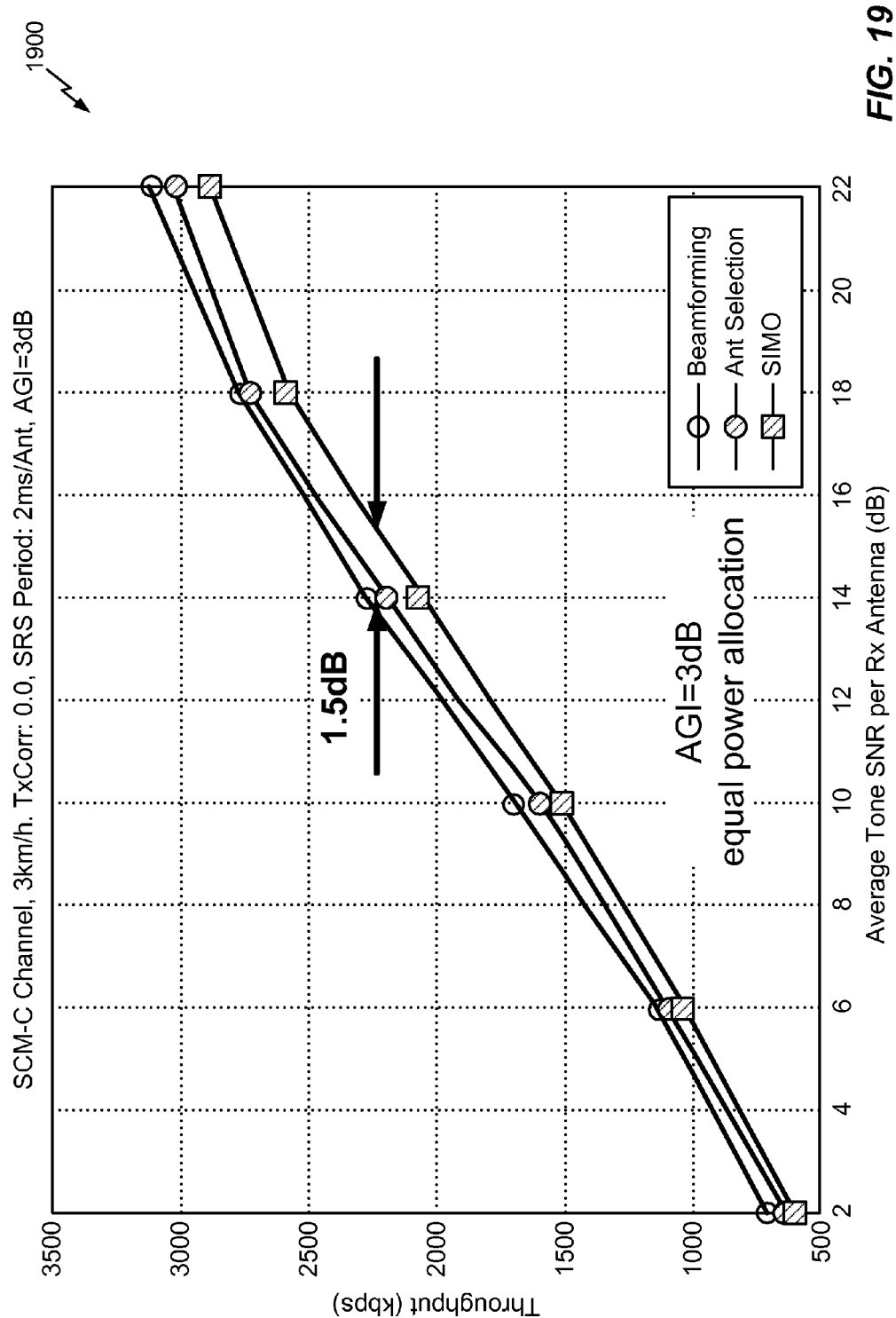
FIG. 19 illustrates a graphical plot of capacity comparison for a non-interference-limited power allocation for rank-1 transmission with Antenna Gain Imbalance (AGI).

In FIG. 18, a graphical capacity comparison 1800 is depicted without AGI for a non-interference-limited power allocation for rank-1 transmission wherein the X-axis is average tone Rx SINR per antenna. In FIG. 19, a graphical capacity comparison 1900 is depicted with AGI of −3 dB for a non-interference-limited power allocation for rank-1 transmission wherein the X-axis is average tone Rx SINR per antenna. It can be observed that compensating AGI can result in power loss, which in the illustrative example of 3 dB AGI is a power loss of around 1.76 dB.

By benefit of the foregoing, it can be concluded that Total Transmission Power Control (TotTPC) with dynamic or semi-static Tx power allocation offers a flexible solution for PUSCH power control with MIMO operation.

In an interference-limited case, AGI compensation is desirable. By contrast, in a non-interference-limited case, optimal power allocation typically will not compensate AGI.

Figure 20:
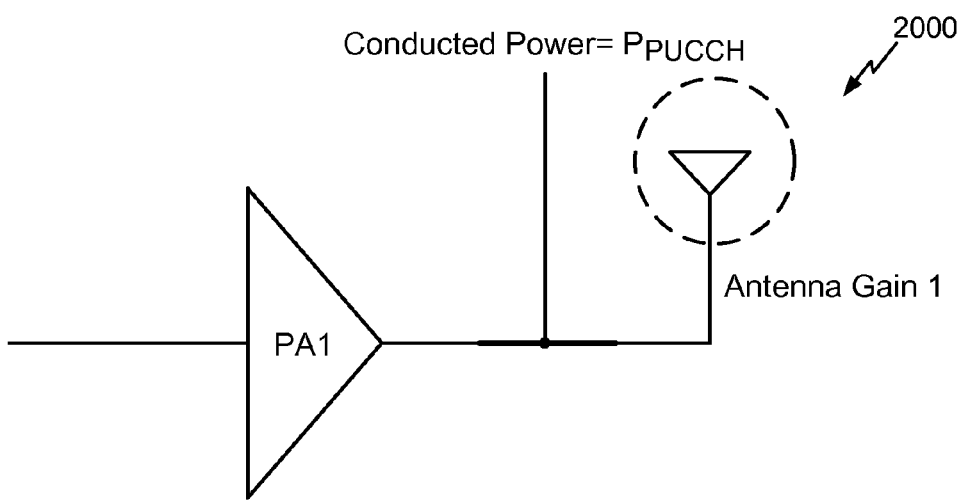
FIG. 20 illustrates a diagram of a single antenna PUCCH power control apparatus.

Power control may also be performed for uplink transmissions using the Physical Uplink Control Channel. As a baseline, consider PUCCH power control in 3GPP LTE (Rel-8) wherein UE PUCCH Tx Power is given by:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$

for a single Tx antenna UE 2000 as depicted in FIG. 20. Total power is conducted to that Tx antenna.

Figure 21:
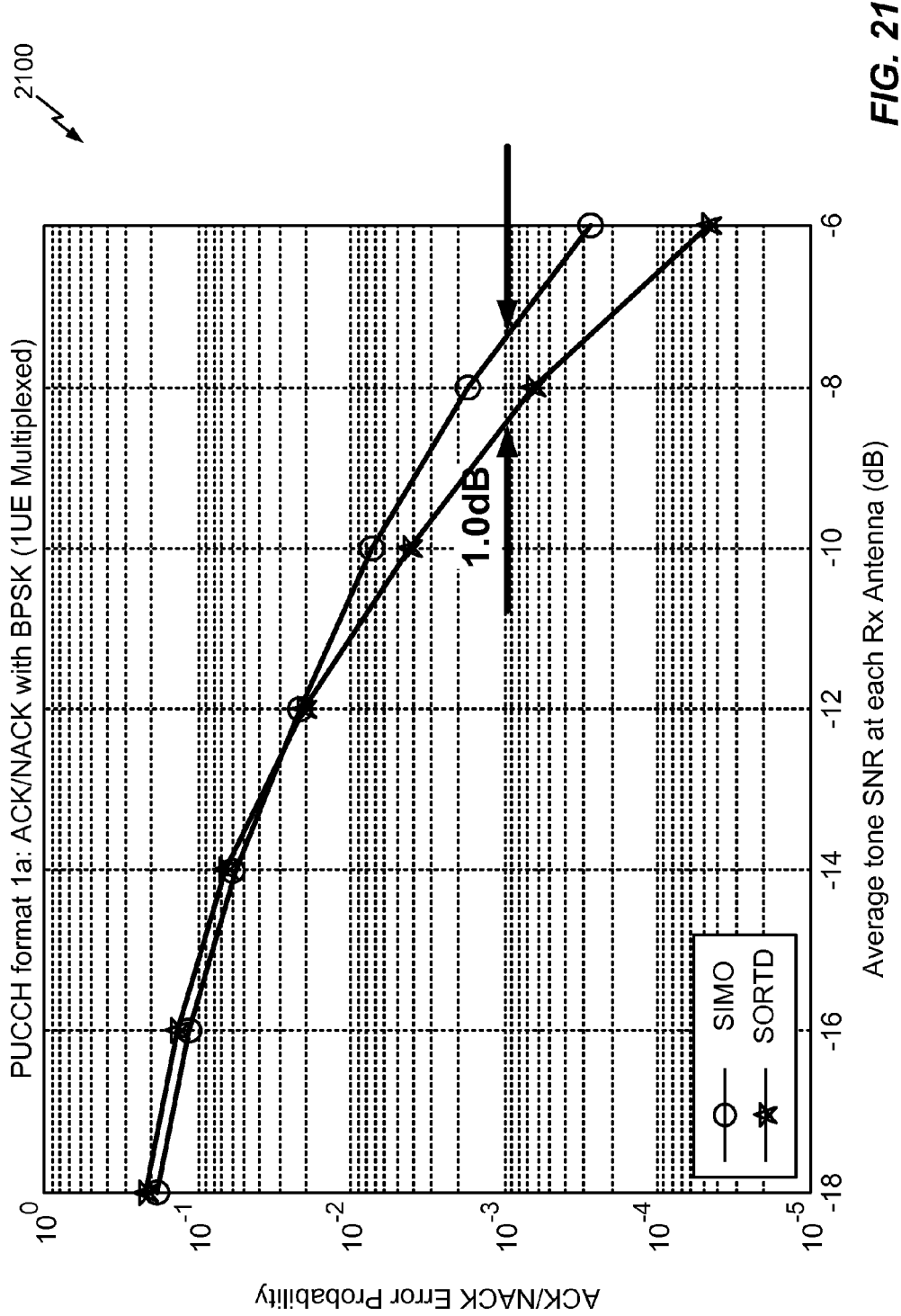
FIG. 21 illustrates a graphical plot for PUCCH Format 1a Tx diversity performance for a multiple transmit uplink.
Figure 22:
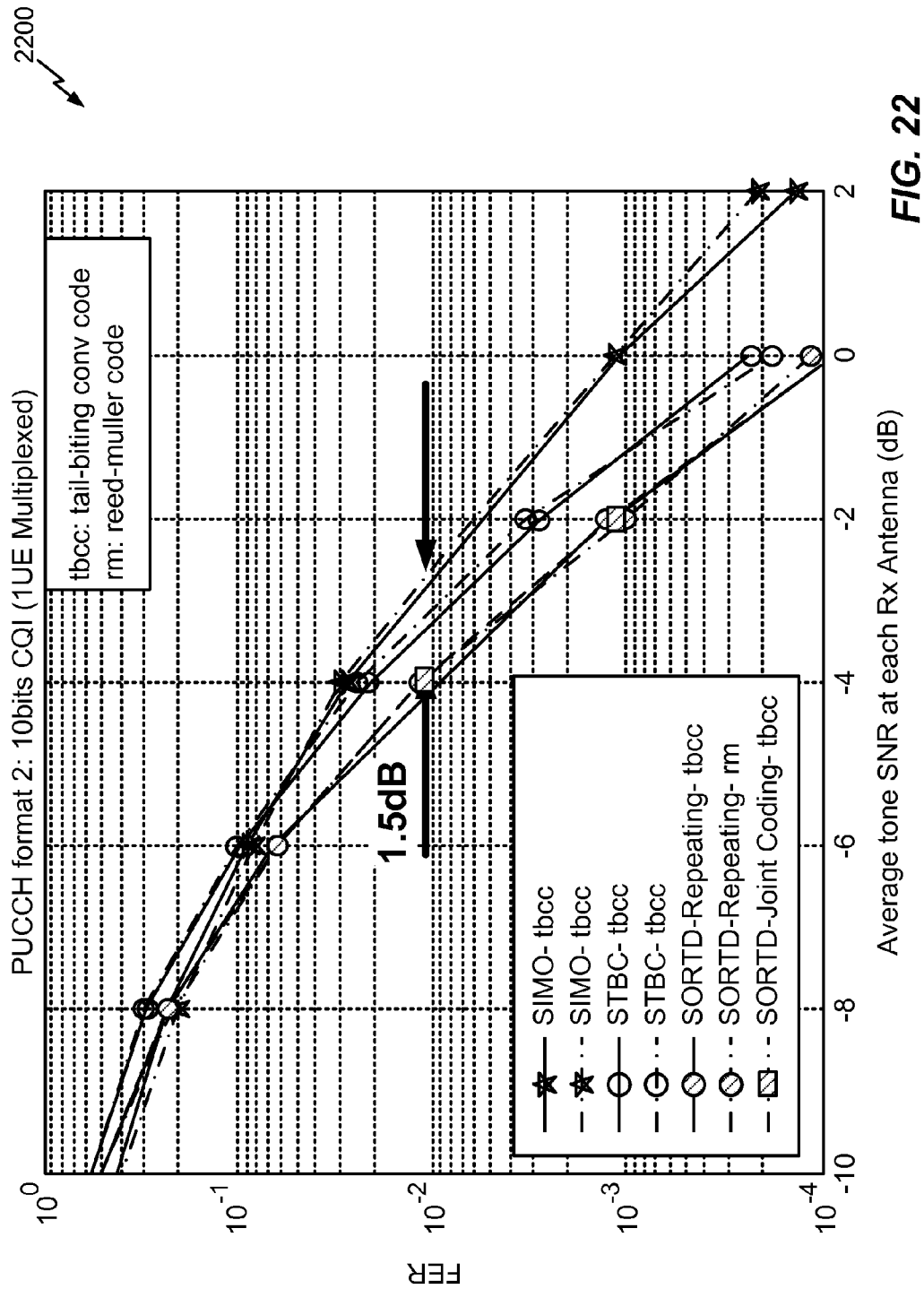
FIG. 22 illustrates a graphical plot for PUCCH Format 2 Tx diversity performance for a multiple transmit uplink.

PUCCH power control in LTE-A can address MIMO uplink transmissions. In FIG. 21, a graphical plot 2100 is provided for PUCCH Format 1a Tx diversity performance for a multiple transmit uplink. In FIG. 22, a graphical plot 2200 is provided for PUCCH Format 2 Tx diversity performance for a multiple transmit uplink. Note that AGI is assumed to be 0 in the above simulations. In one aspect, diversity scheme should be applied when each antenna can have the same average SNIR at Rx as a Single Input Multiple Output (SIMO) scheme.

When AGI is greater than 0, at the same total conducted power, the diversity scheme suffers from receiver side SNR loss. For instance, 3 dB AGI gives 1.25 dB SNIR loss at Rx with equal power conducted at each PA. In addition, compensation of AGI of 3 dB creates 1.76 dB SNR loss.

In LTE-A, PUCCH power control may be performed according to:

$$P_{PUCCH}(i) = \min\{P_{CMAX}, P_{0\_PUCCH} + PL + h(n_{CQI}, n_{HARQ}, I_{scheme}) + \Delta_{F\_PUCCH}(F) + g(i)\},$$

wherein $I_{scheme}$ refers to various PUCCH transmission schemes, also called "modes." Path loss (PL) may be estimated at the main antenna is AGI is measurably non-zero, and averaged over all antennas if AGI is not measurably non-zero, for example, if AGI is zero.

Possible PUCCH Tx schemes may include:

Mode1: Single antenna transmission using the 23 dBm main antenna (Rel-8 mode);

Mode2: Multiple-antenna transmission for diversity (SORT-repeating information over different antenna);

Mode3: Multiple-antenna transmission for multiplexing, wherein joint coding is applied over different antenna or simply applying Rel-8 format over each antenna for part of the information; and Mode4: Multiple-antenna transmission with long-term Rank-1 precoding, wherein precoding relies on channel correlation.

PUCCH Tx mode selection and power control may be performed, in response to the UE being in an interference-limited condition, or not in an interference-limited condition. For interference-limited UEs, power control will result in the same average Rx SINR by using one of the Modes 2, 3, 4 with appropriate power allocation compensating AGI. For non-interference-limited UEs with AGI below a predefined threshold, one of the Modes 2, 3, 4 is used with eNB signaled power allocation. For AGI above the predefined threshold, Mode 1 is used. The predefined threshold may be determined as a trade-off between Rx SNIR loss and diversity gain.

In one aspect, total power control and power allocation may be semi-statically signaled (L3) by eNB, which for instance can be supported by two-bit power allocation codebook. Power allocation for PUCCH should be sent separately and may be different from power allocation for PUSCH because of different Tx schemes. The eNB determined whether or not to compensate AGI according to the condition of the UE and the Tx Mode.

Figure 23:
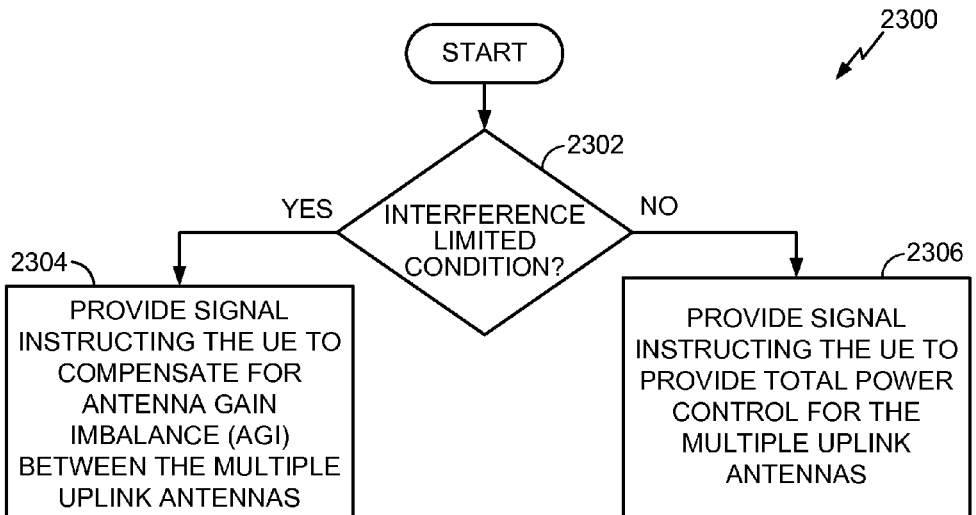
FIG. 23 illustrates a flow diagram showing exemplary features of a method for transmit power control of uplink multiple antennas used in a wireless communication network.

Consistent with the foregoing disclosure, a method 2300 for controlling uplink transmission power may include steps and operations as illustrated by FIG. 23. Method 2300 may be performed by a base station in communication with a UE, or by a UE in communication with a base station. The method controls transmit power for multiple uplink antennas of UE in a wireless communication network, using a processor in communication with the UE. The processor is responsive 2302 to a determination of whether transmission from the UE is in an interference limited condition with a neighboring base station. In response to determining that an interference-limited condition applies, the processor provides 2304 a signal instructing the UE to compensate for antenna gain imbalance (AGI) between the multiple uplink antennas. In response to determining that an interference-limited condition does not apply, the processor provides 2306 a signal instructing the UE to perform total power control for the multiple uplink antennas.

Figure 24:
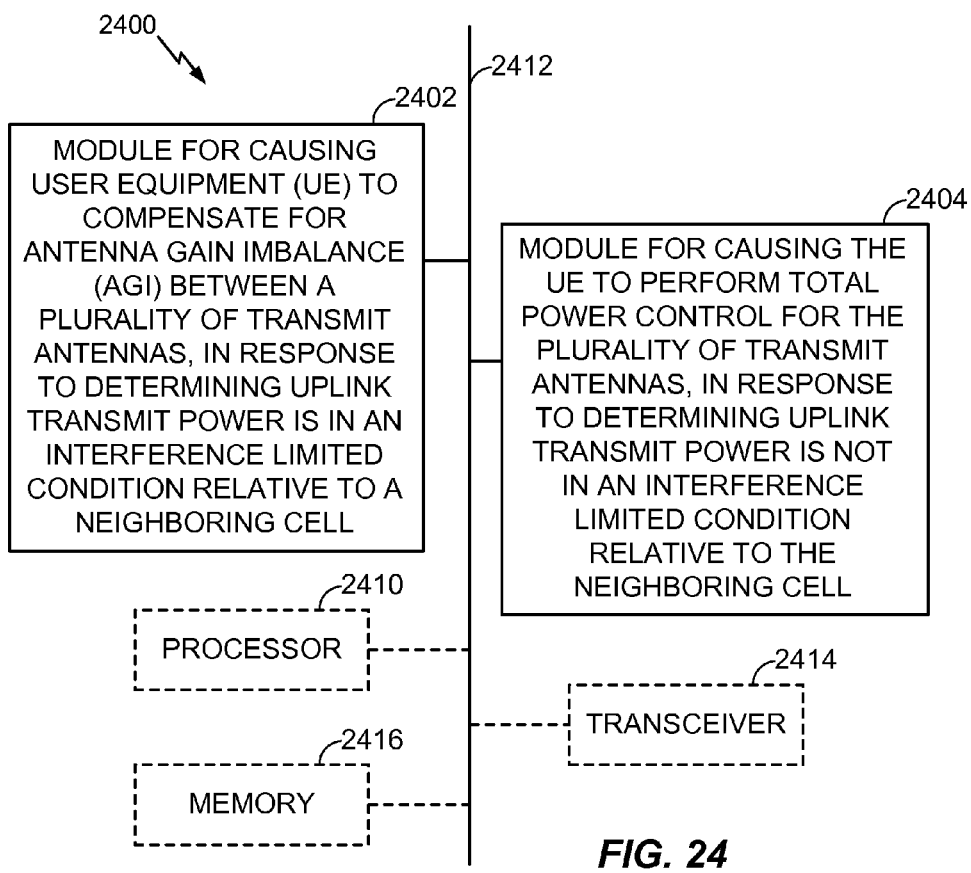
FIG. 24 illustrates an apparatus for performing the method of FIG. 23.

Consistent with method 2300, and as further illustrated by FIG. 24, an apparatus 2400 may function to control transmit power for multiple uplink antennas of UE in a wireless communication network. The apparatus 2400 may comprise an electronic component or module 2402 for causing UE to compensate for AGI between a plurality of transmit antennas, in response to determining uplink transmit power is in an interference limited condition relative to a neighboring cell. The apparatus 2400 may comprise an electronic component or module 2404 for causing the UE to perform total power control for the plurality of transmit antennas, in response to determining uplink transmit power is not in an interference limited condition relative to the neighboring cell.

The apparatus 2400 may optionally include a processor module 2410 having at least one processor; in the case of the apparatus 2400 configured as a communication network entity, rather than as a general purpose microprocessor. The processor 2410, in such case, may be in operative communication with the modules 2402-2404 via a bus 2412 or similar communication coupling. The processor 2410 may effect initiation and scheduling of the processes or functions performed by electrical components 2402-2404.

In related aspects, the apparatus 2400 may include a transceiver module 2414 for communicating with a mobile station. A stand alone receiver and/or stand alone transmitter may be used in lieu of or in conjunction with the transceiver 2414. In further related aspects, the apparatus 2400 may optionally include a module for storing information, such as, for example, a memory device/module 2416. The computer readable medium or the memory module 2416 may be operatively coupled to the other components of the apparatus 2400 via the bus 2412 or the like. The memory module 2416 may be adapted to store computer readable instructions and data for effecting the processes and behavior of the modules 2402-2404, and subcomponents thereof, or the processor 2410, or the methods disclosed herein, and other operations for wireless communications. The memory module 2416 may retain instructions for executing functions associated with the modules 2402-2404. While shown as being external to the memory 2416, it is to be understood that the modules 2402-2404 may exist at least partly within the memory 2416.

In further related aspects, the memory 2416 may optionally include executable code for the processor module 2410 and/or ones of the modules 2402-2404 to cause the apparatus 2400 perform a method that comprises the steps of: (a) providing a signal instructing User Equipment (UE) having multiple uplink antennas to compensate for antenna gain imbalance (AGI) between the multiple uplink antennas, in response to determining that uplink transmission from the UE is in an interference limited condition; and (b) providing a signal instructing the UE to perform total power control for the multiple uplink antennas in response to determining that uplink transmission from the UE is not in an interference limited condition. Similarly, the memory 2416 may optionally include executable code for the processor module 2410 to cause the apparatus 2400 to perform method 2300 as described in connection with FIG. 23 above.

Figure 25:
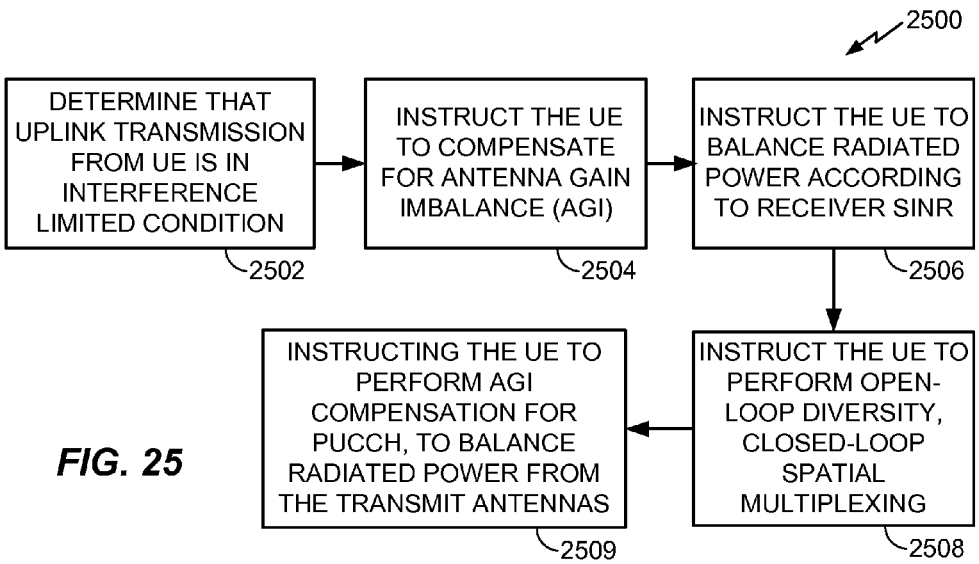
FIG. 25 illustrates a flow diagram showing exemplary further actions that may be performed as part of, or in addition to, the method of FIG. 23.

Further consistent with the foregoing disclosure, additional operations 2500 for controlling uplink transmission power, where the processor determines that the uplink transmission from the UE is in an interference limited condition, may include steps and operations as illustrated by FIG. 25. These additional operations 2500 may be performed as part of, or in addition to method 2300. Accordingly, operations 2500 may be performed by a base station in communication with a UE, or by a UE in communication with a base station. The method and additional operations may be used to control transmit power for multiple uplink antennas of UE in a wireless communication network, using a processor in communication with the UE.

The additional operations may include determining 2502 that uplink transmission from the UE is in an interference limited condition relative to a neighboring cell. The additional operations may include providing a signal instructing 2504 the UE to balance radiated power from each transmit antenna according to receiver SINR. The additional operations may include providing a signal instructing 2508 the UE to perform open-loop diversity, closed-loop spatial multiplexing.

The additional operations may further include providing a signal instructing the UE to perform transmit power control for a PUCCH. In response to determining that uplink transmission from the UE is in an interference limited condition relative to a neighboring cell, the additional operations may include instructing 2509 the UE to perform AGI compensation to balance radiated power from the transmit antennas.

Figure 26:
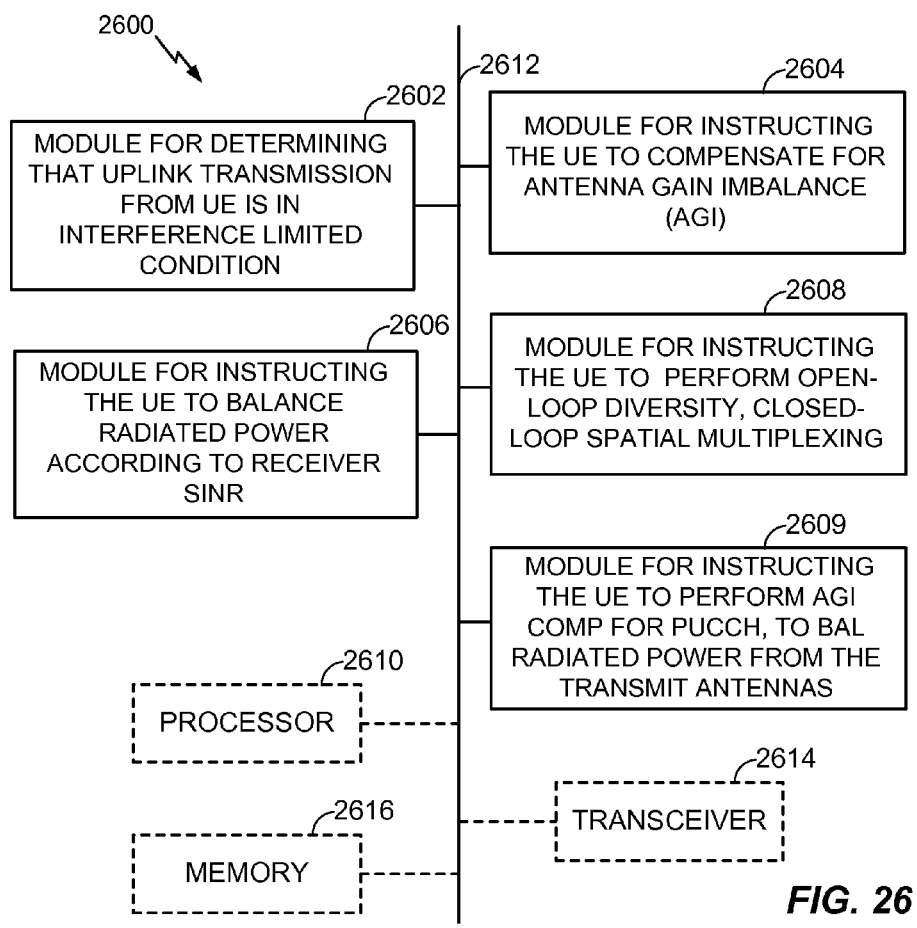
FIG. 26 illustrates an apparatus for performing the further actions of FIG. 25.

Consistent with the additional operations 2500, and as further illustrated by FIG. 26, an apparatus 2600 may function to perform the additional operations shown in FIG. 25. Apparatus 2600 may be merged with apparatus 2400 described above; that is, may comprise part of a unitary apparatus. The apparatus 2600 may comprise an electronic component or module 2602 for determining that uplink transmission from the UE is in an interference limited condition relative to a neighboring cell. The apparatus 2600 may comprise an electronic component or module 2604 for providing a signal instructing the UE to balance radiated power from each transmit antenna according to receiver SINR. The apparatus 2600 may comprise an electronic component or module for providing a signal 2608 instructing the UE to perform open-loop diversity, closed-loop spatial multiplexing. The apparatus 2600 may comprise an electronic component or module for instructing 2609 the UE to perform AGI compensation to balance radiated power from the transmit antennas, to perform transmit power control for a PUCCH.

The apparatus 2600 may optionally include a processor module 2610 having at least one processor; in the case of the apparatus 2600 configured as a communication network entity, rather than as a general purpose microprocessor. The processor 2610, in such case, may be in operative communication with the modules 2602-2609 via a bus 2612 or similar communication coupling. The processor 2610 may effect initiation and scheduling of the processes or functions performed by electrical components 2602-2609.

In related aspects, the apparatus 2600 may include a transceiver module 2614 for communicating with a mobile station. A stand alone receiver and/or stand alone transmitter may be used in lieu of or in conjunction with the transceiver 2614. In further related aspects, the apparatus 2600 may optionally include a module for storing information, such as, for example, a memory device/module 2616. The computer readable medium or the memory module 2616 may be operatively coupled to the other components of the apparatus 2600 via the bus 2612 or the like. The memory module 2616 may be adapted to store computer readable instructions and data for effecting the processes and behavior of the modules 2602-2604, and subcomponents thereof, or the processor 2610, or the methods disclosed herein, and other operations for wireless communications. The memory module 2616 may retain instructions for executing functions associated with the modules 2602-2604. While shown as being external to the memory 2616, it is to be understood that the modules 2602-2604 may exist at least partly within the memory 2616.

In further related aspects, the memory 2616 may optionally include executable code for the processor module 2610 and/or ones of the modules 2602-2604 to cause the apparatus 2600 to perform a method 2300 as described in connection with FIG. 23 above, with one or more additional actions 2500 as described in connection with FIG. 25.

Figure 27:
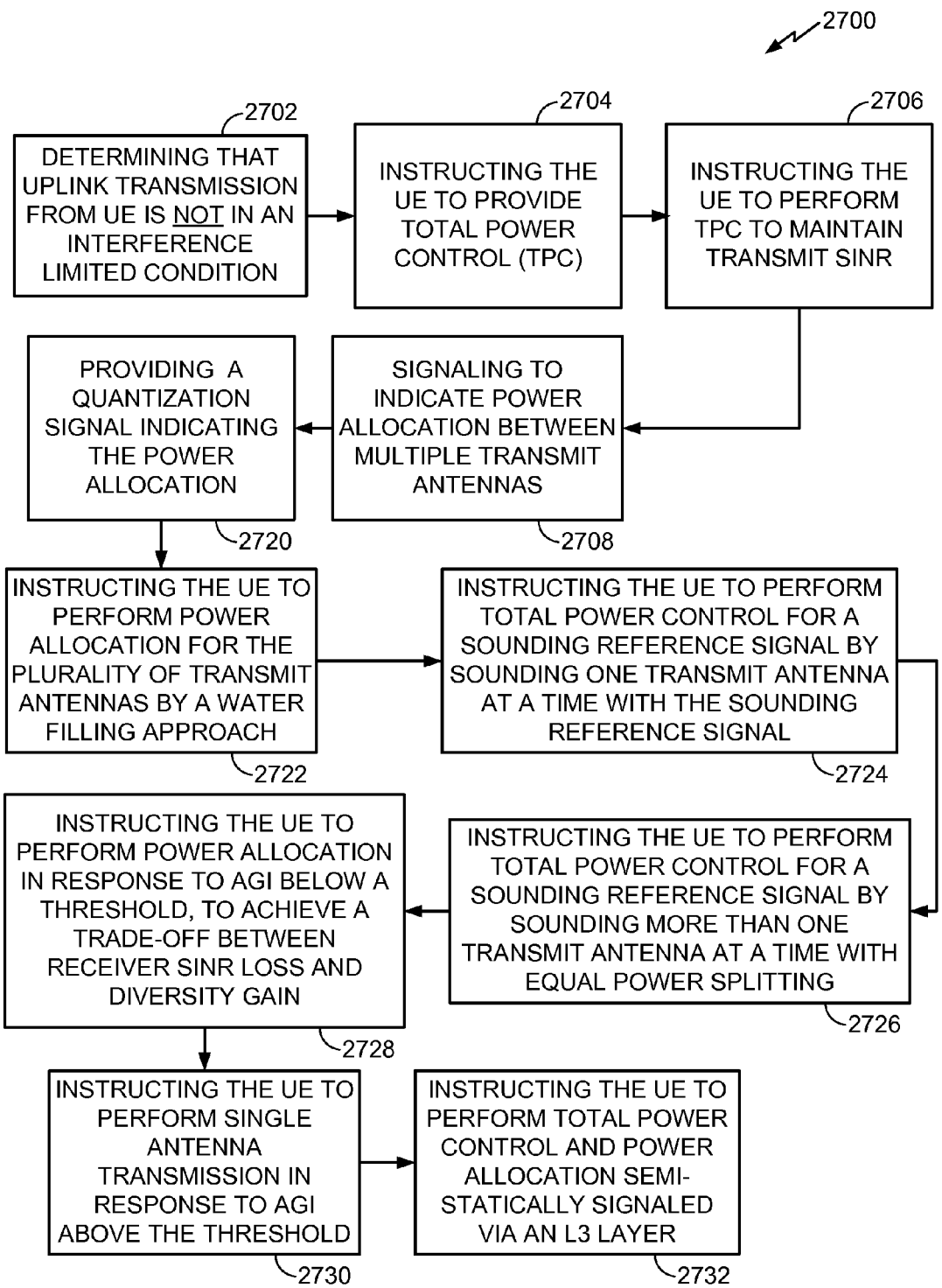
FIG. 27 illustrates a flow diagram showing exemplary further actions that may be performed as part of, or in addition to, the method of FIG. 23.

Further consistent with the foregoing disclosure, additional operations 2700 for controlling uplink transmission power, where the processor determines that the uplink transmission from the UE is not in an interference limited condition, may include steps and operations as illustrated by FIG. 27. These additional operations 2700 may be performed as part of, or in addition to method 2300. Accordingly, operations 2700 may be performed between a base station and a UE. The method and additional operations may be used to control transmit power for multiple uplink antennas of UE in a wireless communication network, using a processor in communication with the UE.

The additional operations may include determining 2702 that uplink transmission from the UE is not in an interference limited condition. The additional operations may include providing 2704 a signal instructing the UE to perform total power control (TPC). The additional operations may include providing 2706 a signal instructing the UE to perform total power control to maintain transmit SINR. The additional operations may include signaling 2708 to indicate power allocation between multiple transmit antennas. The additional operations may include providing 2720 a quantization signal to indicate the power allocation. The additional operations may include providing a signal instructing 2722 the UE to perform power allocation for the plurality of transmit antennas by a water filling approach. The additional operations may include providing a signal instructing 2724 the UE to perform total power control for a sounding reference signal by sounding one transmit antenna at a time with the sounding reference signal following total transmit power for a PUSCH. The additional operations may include providing a signal instructing 2726 the UE to perform total power control for a sounding reference signal by sounding more than one transmit antenna at a time with equal power splitting. The additional operations may include providing a signal instructing 2728 the UE to perform power allocation for the plurality of transmit antennas in response to determining that AGI is below a predetermined threshold, to achieve a trade-off between receiver SINR loss and diversity gain. In addition, the additional operations may include providing a signal instructing 2730 the UE to perform single antenna transmission in response to determining that AGI is above the predetermined threshold. The additional operations may include providing a signal instructing 2732 the UE to perform total power control and power allocation semi-statically signaled via an L3 layer signaling from a node.

Figure 28:
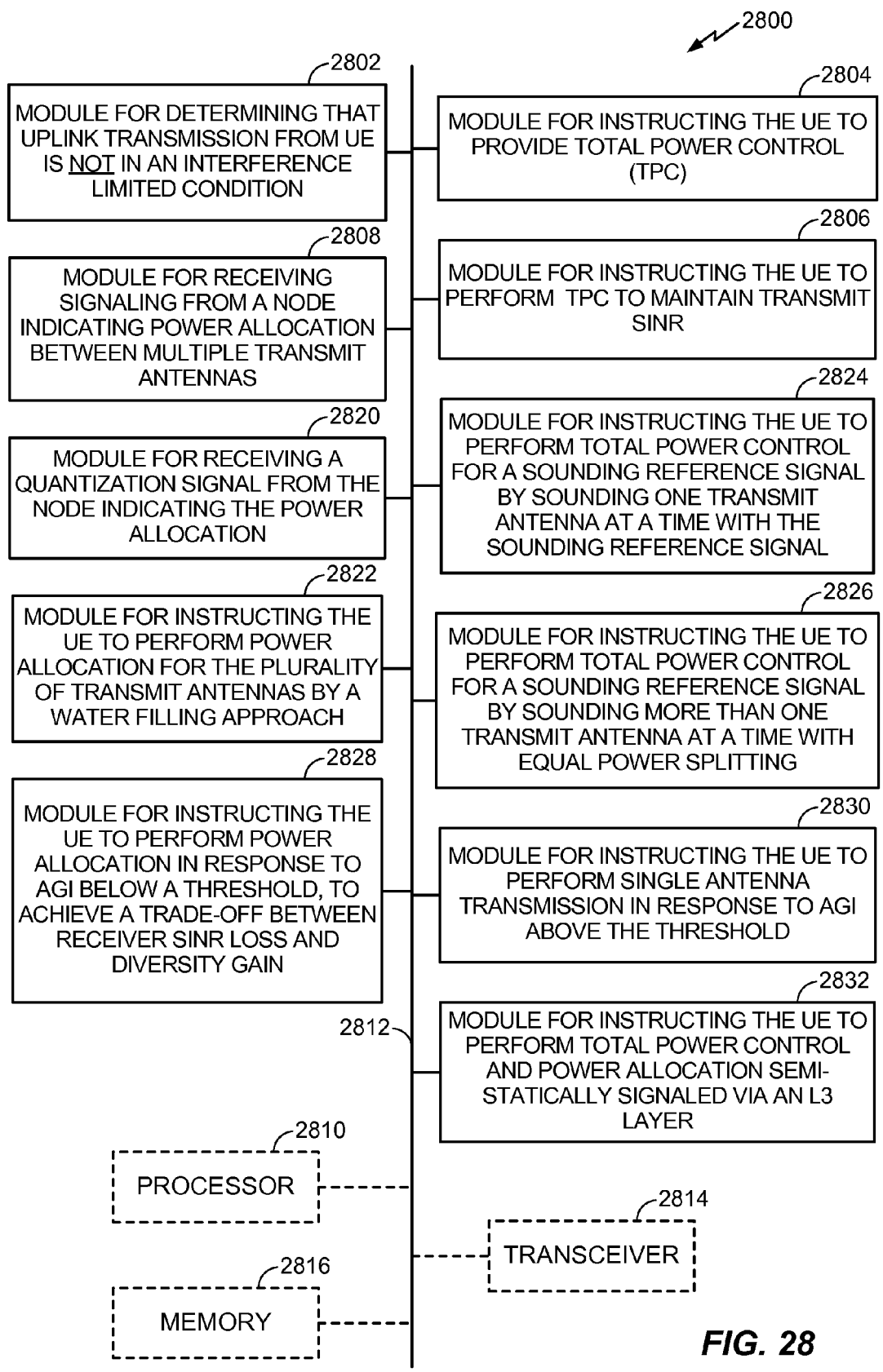
FIG. 28 illustrates an apparatus for performing the further actions of FIG. 27.

Consistent with the additional operations 2700, and as further illustrated by FIG. 28, an apparatus 2800 may function to perform the additional operations shown in FIG. 27. Apparatus 2800 may be merged with apparatus 2400 described above; that is, may comprise part of a unitary apparatus with apparatus 2400. The apparatus 2800 may comprise an electronic component or module 2802 for determining that uplink transmission from the UE is not in an interference limited condition. The apparatus 2800 may comprise an electronic component or module 2804 for providing a signal instructing the UE to perform total power control (TPC). The apparatus 2800 may comprise an electronic component or module 2806 for providing a signal instructing the UE to perform total power control to maintain transmit SINR. The apparatus 2800 may comprise an electronic component or module 2808 for providing a signal indicating power allocation between multiple transmit antennas. The apparatus 2800 may comprise an electronic component or module 2820 for providing a quantization signal indicating the power allocation. The apparatus 2800 may comprise an electronic component or module 2822 for providing a signal instructing the UE to perform power allocation for the plurality of transmit antennas by a water filling approach. The apparatus 2800 may comprise an electronic component or module 2724 providing a signal instructing the UE to perform total power control for a sounding reference signal by sounding one transmit antenna at a time with the sounding reference signal following total transmit power for a PUSCH. The apparatus 2800 may comprise an electronic component or module 2826 for providing a signal instructing the UE to perform total power control for a sounding reference signal by sounding more than one transmit antenna at a time with equal power splitting. The apparatus 2800 may comprise an electronic component or module 2828 for providing a signal instructing the UE to perform power allocation for the plurality of transmit antennas in response to determining that AGI is below a predetermined threshold, to achieve a trade-off between receiver SINR loss and diversity gain. In addition, the apparatus 2800 may comprise an electronic component or module 2830 for providing a signal instructing the UE to perform single antenna transmission in response to determining that AGI is above the predetermined threshold. The apparatus 2800 may comprise an electronic component or module 2832 for providing a signal instructing the UE to perform total power control and power allocation semi-statically signaled via an L3 layer signaling from a node.

The apparatus 2800 may optionally include a processor module 2810 having at least one processor; in the case of the apparatus 2800 configured as a communication network entity, rather than as a general purpose microprocessor. The processor 2810, in such case, may be in operative communication with the modules 2802-2832 via a bus 2812 or similar communication coupling. The processor 2810 may effect initiation and scheduling of the processes or functions performed by electrical components 2802-2832.

In related aspects, the apparatus 2800 may include a transceiver module 2814 for communicating with a mobile station. A stand alone receiver and/or stand alone transmitter may be used in lieu of or in conjunction with the transceiver 2814. In further related aspects, the apparatus 2800 may optionally include a module for storing information, such as, for example, a memory device/module 2816. The computer readable medium or the memory module 2816 may be operatively coupled to the other components of the apparatus 2800 via the bus 2812 or the like. The memory module 2816 may be adapted to store computer readable instructions and data for effecting the processes and behavior of the modules 2802-2832, and subcomponents thereof, or the processor 2810, or the methods disclosed herein, and other operations for wireless communications. The memory module 2816 may retain instructions for executing functions associated with the modules 2802-2832. While shown as being external to the memory 2816, it is to be understood that the modules 2802-2832 may exist at least partly within the memory 2816.

In further related aspects, the memory 2816 may optionally include executable code for the processor module 2810 and/or ones of the modules 2802-2832 to cause the apparatus 2800 to perform a method 2300 as described in connection with FIG. 23 above, with one or more additional actions 2700 as described in connection with FIG. 27.

Figure 29:
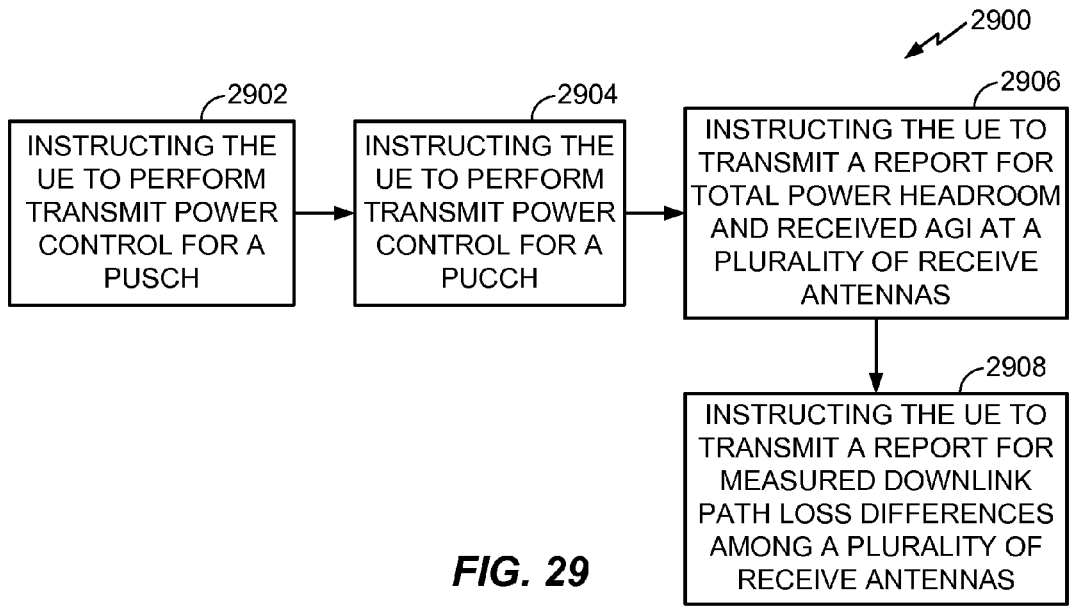
FIG. 29 illustrates a flow diagram showing exemplary further actions that may be performed as part of, or in addition to, the method of FIG. 23.

Further consistent with the foregoing disclosure, additional operations 2900 for controlling uplink transmission power, whether or not the processor determines that the uplink transmission from the UE is in an interference limited condition or not in such condition, may include steps and operations as illustrated by FIG. 29. These additional operations 2900 may be performed as part of, or in addition to method 2300. Accordingly, operations 2900 may be performed by a base station in communication with a UE, or by a UE in communication with a base station. The method and additional operations may be used to control transmit power for multiple uplink antennas of UE in a wireless communication network, using a processor in communication with the UE.

The additional operations may include providing 2902 a signal instructing the UE to perform transmit power control for a PUSCH. The additional operations may include providing 2904 a signal instructing the UE to perform transmit power control for a PUCCH. The additional operations may include providing 2906 a signal instructing the UE to transmit a report for total power headroom and received AGI at a plurality of receive antennas. The additional operations may include providing 2908 a signal instructing the UE to transmit a report for measured downlink path loss differences among a plurality of receive antennas.

Figure 30:
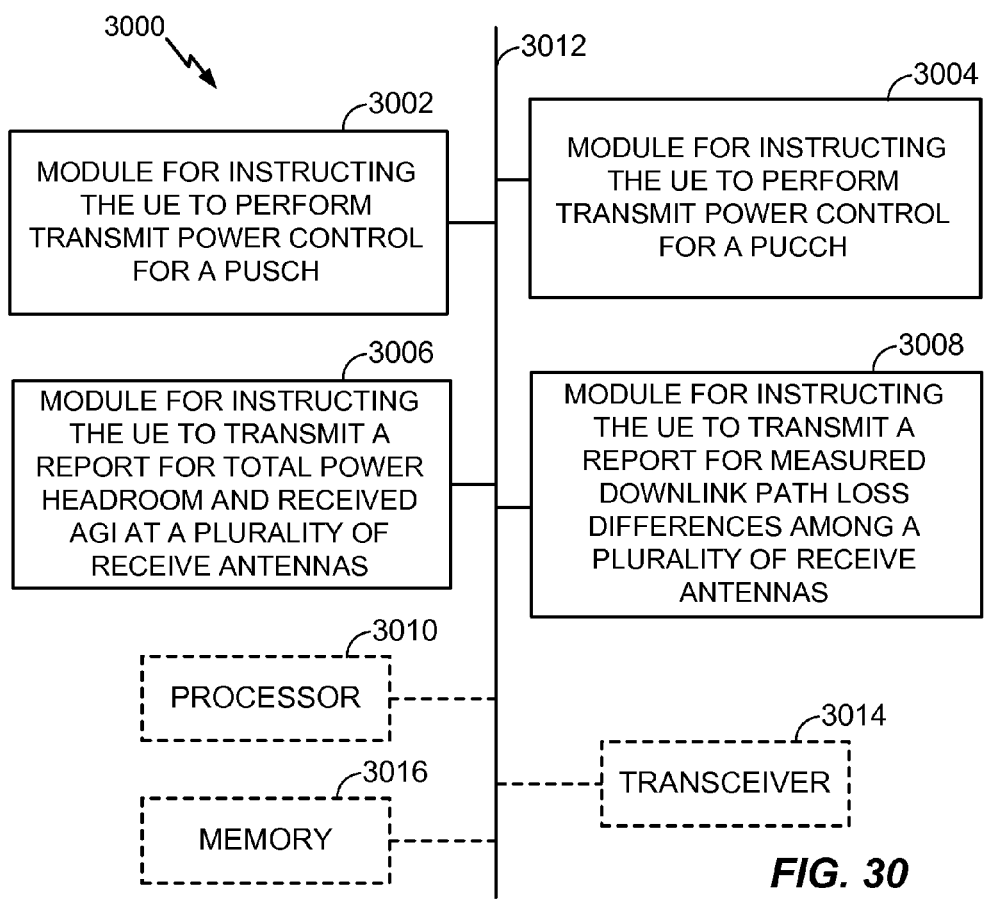
FIG. 30 illustrates an apparatus for performing the further actions of FIG. 29.

Consistent with the additional operations 2900, and as further illustrated by FIG. 30, an apparatus 3000 may function to perform the additional operations shown in FIG. 29. Apparatus 3000 may be merged with apparatus 2400 described above; that is, may comprise part of a unitary apparatus with apparatus 2400. The apparatus 3000 may comprise an electronic component or module 3002 for providing a signal instructing the UE to perform transmit power control for a PUSCH. The apparatus 3000 may comprise an electronic component or module 3004 for providing a signal instructing the UE to perform transmit power control for a PUCCH. The apparatus 3000 may comprise an electronic component or module 3006 for providing a signal instructing the UE to transmit a report for total power headroom and received AGI at a plurality of receive antennas. The apparatus 3000 may comprise an electronic component or module 3008 for providing a signal instructing the UE to transmit a report for measured downlink path loss differences among a plurality of receive antennas.

The apparatus 3000 may optionally include a processor module 3010 having at least one processor; in the case of the apparatus 3000 configured as a communication network entity, rather than as a general purpose microprocessor. The processor 3010, in such case, may be in operative communication with the modules 3002-3008 via a bus 3012 or similar communication coupling. The processor 3010 may effect initiation and scheduling of the processes or functions performed by electrical components 3002-3008.

In related aspects, the apparatus 3000 may include a transceiver module 3014 for communicating with a mobile station. A stand alone receiver and/or stand alone transmitter may be used in lieu of or in conjunction with the transceiver 3014. In further related aspects, the apparatus 3000 may optionally include a module for storing information, such as, for example, a memory device/module 3016. The computer readable medium or the memory module 3016 may be operatively coupled to the other components of the apparatus 3000 via the bus 3012 or the like. The memory module 3016 may be adapted to store computer readable instructions and data for effecting the processes and behavior of the modules 3002-3008, and subcomponents thereof, or the processor 3010, or the methods disclosed herein, and other operations for wireless communications. The memory module 3016 may retain instructions for executing functions associated with the modules 3002-3008. While shown as being external to the memory 3016, it is to be understood that the modules 3002-3008 may exist at least partly within the memory 3016.

In further related aspects, the memory 3016 may optionally include executable code for the processor module 3010 and/or ones of the modules 3002-3008 to cause the apparatus 3000 to perform a method 2300 as described in connection with FIG. 23 above, with one or more additional actions 2900 as described in connection with FIG. 29.

Consistent with the foregoing disclosure, a method 3100 for controlling uplink transmission power may include steps and operations as illustrated by FIG. 23. Method 3100 may be performed by a base station in communication with a UE, or by a UE in communication with a base station. The method 3100 may be used to control transmit power for multiple uplink antennas of UE in a wireless communication network, using a processor in communication with the UE, for example, by providing control parameters to the UE for controlling antenna power in uplink transmission from the multiple uplink antennas of the UE. Method 3100 may include receiving 3102 a report from the UE characterizing total power headroom and AGI for the multiple uplink antennas. Method 3100 may include determining 3104 a power allocation scheme, a transmission rank and a precoding matrix in response to the report, as described in more detail in the foregoing description. Method 3100 may include transmitting 3106 the power allocation scheme, the transmission rank and the precoding matrix to the user equipment for use for uplink transmission. Optionally, method 3100 may also include normalizing 3108 a plurality of antenna selection vectors to provide normalized vectors, and using the normalized vectors as special precoding vectors.

Figure 32:
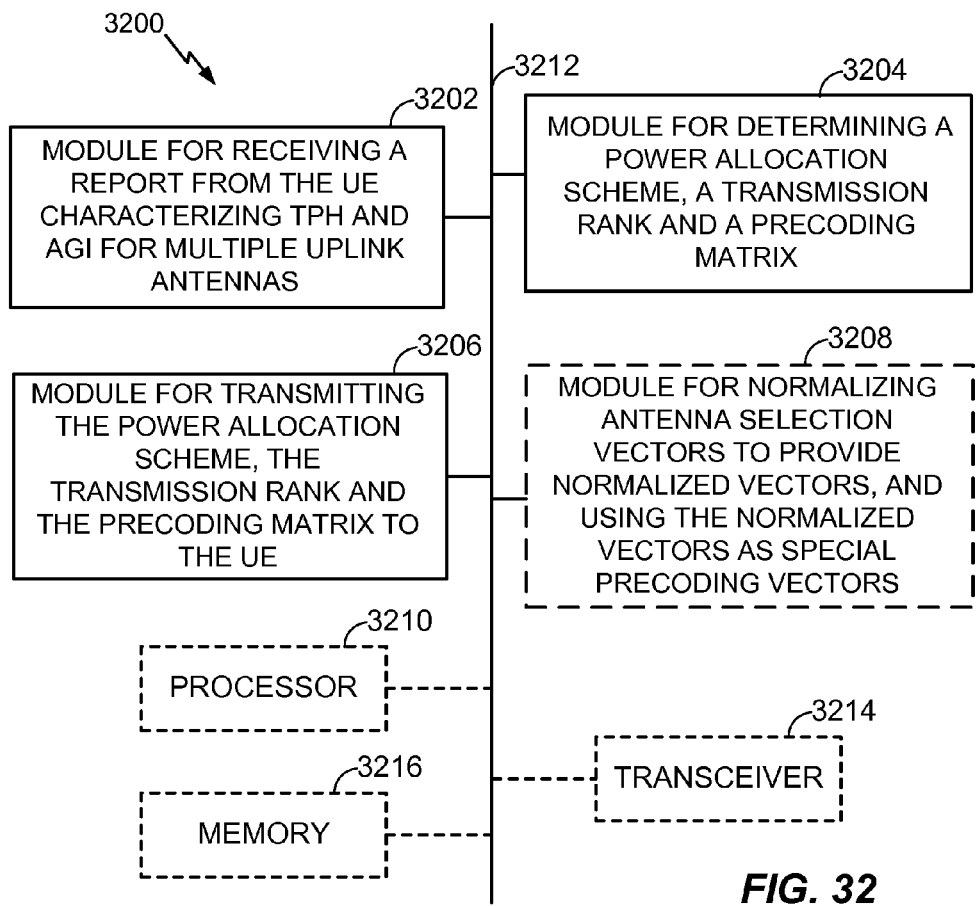
FIG. 32 illustrates an apparatus for performing the method of FIG. 32.

Consistent with method 3100, and as further illustrated by FIG. 32, an apparatus 3200 may function to control transmit power for multiple uplink antennas of UE in a wireless communication network. The apparatus 3200 may comprise an electronic component or module 3202 for receiving a report from the UE characterizing total power headroom and AGI for the multiple uplink antennas. The apparatus 2400 may comprise an electronic component or module 3204 for determining a power allocation scheme, a transmission rank and a precoding matrix in response to the report, according to details in the foregoing description. The apparatus 2400 may comprise an electronic component or module 3206 for transmitting the power allocation scheme, the transmission rank and the precoding matrix to the user equipment for use for uplink transmission. Optionally, the apparatus 3200 may comprise an electronic component or module 3208 for normalizing a plurality of antenna selection vectors to provide normalized vectors, and using the normalized vectors as special precoding vectors.

The apparatus 3200 may optionally include a processor module 3210 having at least one processor; in the case of the apparatus 3200 configured as a communication network entity, rather than as a general purpose microprocessor. The processor 3210, in such case, may be in operative communication with the modules 3202-3208 via a bus 3212 or similar communication coupling. The processor 3210 may effect initiation and scheduling of the processes or functions performed by electrical components 3202-3208.

In related aspects, the apparatus 3200 may include a transceiver module 3214 for communicating with a mobile station. A stand alone receiver and/or stand alone transmitter may be used in lieu of or in conjunction with the transceiver 3214. In further related aspects, the apparatus 3200 may optionally include a module for storing information, such as, for example, a memory device/module 3216. The computer readable medium or the memory module 3216 may be operatively coupled to the other components of the apparatus 3200 via the bus 3212 or the like. The memory module 3216 may be adapted to store computer readable instructions and data for effecting the processes and behavior of the modules 3202-3208, and subcomponents thereof, or the processor 3210, or the methods disclosed herein, and other operations for wireless communications. The memory module 3216 may retain instructions for executing functions associated with the modules 3202-3208. While shown as being external to the memory 3216, it is to be understood that the modules 3202-3208 may exist at least partly within the memory 3216.

Figure 31:
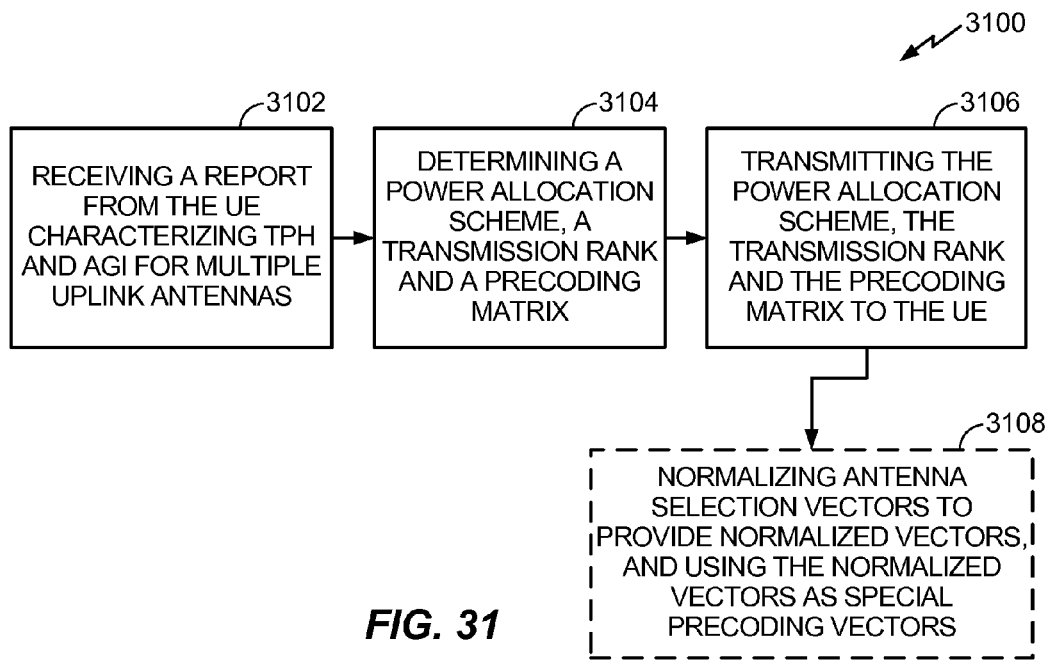
FIG. 31 illustrates a flow diagram showing exemplary features of a method for controlling uplink transmission power of multiple antennas used in a wireless communication network.

In further related aspects, the memory 3216 may optionally include executable code for the processor module 3210 and/or ones of the modules 3202-3206 to cause the apparatus 3200 perform a method that comprises the steps of: (a) receiving a report from the UE characterizing total power headroom and AGI for the multiple uplink antennas; (b) determining a power allocation scheme, a transmission rank and a precoding matrix in response to the report; and (c) transmitting the power allocation scheme, the transmission rank and the precoding matrix to the user equipment for use for uplink transmission. Similarly, the memory 3216 may optionally include executable code for the processor module 3210 to cause the apparatus 3200 to perform method 3100 as described in connection with FIG. 31 above.

For clarity, various depictions have been described with two Tx antennas with adjusted conducted power control. It should be appreciated with the benefit of the present disclosure that aspects described herein are applicable to other numbers of Tx antennas, such as four. In addition, some aspects disclosed herein could have application to other protocols, to a downlink in a scheduled system, or to peer links in an ad hoc network.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, or media. For example, computer readable media may include non-transitory computer readable media, and may not be limited to magnetic storage devices (e.g., hard disk, floppy disk, magnetic strips, or other media), optical disks (e.g., compact disk (CD), digital versatile disk (DVD), or other media), smart cards, and flash memory devices (e.g., card, stick).

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for wireless communication, comprising:
   determining whether uplink transmission from a user equipment (UE) is in an interference limited condition;
   instructing the UE to compensate for antenna gain imbalance (AGI) between multiple antennas of the UE, in response to determining that the uplink transmission is in the interference limited condition; and
   instructing the UE to perform total power control for the multiple antennas, in response to determining that the uplink transmission is not in the interference limited condition.

2. The method of claim 1, further comprising, in response to determining that the uplink transmission is in the interference limited condition relative to a neighboring cell:
   instructing the UE to balance radiated power from each antenna according to receiver Signal-to-Interference-plus-Noise Ratio (SINR); and
   instructing the UE to perform one of open-loop diversity and closed-loop spatial multiplexing.

3. The method of claim 1, further comprising, in response to determining that the uplink transmission is not in the interference limited condition relative to a neighboring cell:

instructing the UE to perform total power control to maintain transmit Signal-to-Interference-plus-Noise Ratio (SINR).

4. The method of claim 3, further comprising signaling to indicate power allocation for the multiple antennas.

5. The method of claim 4, further comprising providing a quantization signal to indicate the power allocation.

6. The method of claim 1, further comprising instructing the UE to perform power allocation for the multiple antennas by a water filling approach.

7. The method of claim 1, further comprising instructing the UE to perform transmit power control for a Physical Uplink Shared Channel (PUSCH).

8. The method of claim 1, further comprising instructing the UE to perform total power control for a sounding reference signal by sounding one antenna at a time with the sounding reference signal following total transmit power for a Physical Uplink Shared Channel (PUSCH).

9. The method of claim 1, further comprising instructing the UE to perform total power control for a sounding reference signal by sounding more than one antenna at a time with equal power splitting.

10. The method of claim 1, further comprising instructing the UE to perform transmit power control for a Physical Uplink Control Channel (PUCCH).

11. The method of claim 10, further comprising, in response to determining that the uplink transmission is not in the interference limited condition relative to a neighboring cell:
instructing the UE to perform power allocation for the multiple antennas if the AGI is below a predetermined threshold, to achieve a trade-off between receiver Signal-to-Interference-plus-Noise Ratio (SINR) loss and diversity gain; and
instructing the UE to perform single antenna transmission if the AGI is above the predetermined threshold.

12. The method of claim 10, further comprising, in response to determining that the uplink transmission is in the interference limited condition relative to a neighboring cell:
instructing the UE to perform AGI compensation to balance radiated power from the antennas.

13. The method of claim 10, further comprising instructing the UE to perform total power control and power allocation semi-statically via an L3 layer signaling.

14. The method of claim 1, further comprising receiving, from the UE, a report for total power headroom and received AGI at a plurality of receive antennas.

15. The method of claim 1, further comprising receiving, from the UE, a report for measured downlink path loss differences among a plurality of receive antennas.

16. A computer-readable storage medium holding coded instructions for causing a computer to:
instruct a user equipment (UE) in a wireless communication network to compensate for antenna gain imbalance (AGI) between multiple antennas of the UE, in response to a determination that uplink transmission from the UE is in an interference limited condition; and
instruct the UE to perform total power control for the multiple antennas, in response to a determination that uplink transmission from the UE is not in the interference limited condition.

17. The computer-readable storage medium of claim 16, further holding coded instructions for causing a computer to:
determine that the uplink transmission from the UE is in the interference limited condition relative to a neighboring cell;
instruct the UE to balance radiated power from each antenna according to receiver Signal-to-Interference-plus-Noise Ratio (SINR); and
instruct the UE to perform one of open-loop diversity and closed-loop spatial multiplexing.

18. The computer-readable storage medium of claim 16, further holding coded instructions for causing a computer to:
determine that the uplink transmission from the UE is not in the interference limited condition relative to a neighboring cell; and
instruct the UE to perform total power control to maintain transmit Signal-to-Interference-plus-Noise Ratio (SINR).

19. An apparatus for wireless communication, comprising:
means for instructing a user equipment (UE) to compensate for antenna gain imbalance (AGI) between multiple antennas of the UE, in response to a determination that uplink transmission from the UE is in an interference limited condition; and
means for instructing the UE to perform total power control for the multiple antennas, in response to a determination that uplink transmission from the UE is not in the interference limited condition.

20. The apparatus of claim 19, further comprising:
means for determining that the uplink transmission from the UE is in the interference limited condition relative to a neighboring cell;
means for instructing the UE to balance radiated power from each antenna according to receiver Signal-to-Interference-plus-Noise Ratio (SINR); and
means for instructing the UE to perform one of open-loop diversity and closed-loop spatial multiplexing.

21. The apparatus of claim 19, further comprising:
means for determining that the uplink transmission from the UE is not in the interference limited condition relative to a neighboring cell; and
means for instructing the UE to perform total power control to maintain transmit Signal-to-Interference-plus-Noise Ratio (SINR).

22. An apparatus for wireless communication, comprising:
a memory holding instructions for providing a signal instructing a user equipment (UE) to compensate for antenna gain imbalance (AGI) between multiple antennas of the UE, in response to a determination that uplink transmission from the UE is in an interference limited condition, and for providing a signal instructing the UE to perform total power control for the multiple antennas, in response to a determination that uplink transmission from the UE is not in the interference limited condition; and
a processor that executes the instructions.

23. The apparatus of claim 22, wherein the memory holds further instructions for, in response to the determination that the uplink transmission is in the interference limited condition relative to a neighboring cell:
providing a signal instructing the UE to balance radiated power from each antenna according to receiver Signal-to-Interference-plus-Noise Ratio (SINR); and
providing a signal instructing the UE to perform one of open-loop diversity and closed-loop spatial multiplexing.

24. The apparatus of claim 22, wherein the memory holds further instructions for, in response to the determination that the uplink transmission is not in the interference limited condition relative to a neighboring cell:

providing a signal instructing the UE to perform total power control to maintain transmit Signal-to-Interference-plus-Noise Ratio (SINR).

25. The apparatus of claim 22, wherein the memory holds further instructions for providing a signal to the UE to indicate power allocation between the multiple antennas.

26. The apparatus of claim 22, wherein the memory holds further instructions for providing a signal instructing the UE to perform power allocation for the multiple antennas by a water filling approach.

27. The apparatus of claim 22, wherein the memory holds further instructions for providing a signal instructing the UE to perform transmit power control for a Physical Uplink Shared Channel (PUSCH).

28. The apparatus of claim 22, wherein the memory holds further instructions for providing a signal instructing the UE to perform total power control for a sounding reference signal by sounding one antenna at a time with the sounding reference signal following total transmit power for a Physical Uplink Shared Channel (PUSCH).

29. The apparatus of claim 22, wherein the memory holds further instructions for providing a signal instructing the UE to perform total power control for a sounding reference signal by sounding more than one antenna at a time with equal power splitting.

30. The apparatus of claim 22, wherein the memory holds further instructions for providing a signal instructing the UE to perform transmit power control for a Physical Uplink Control Channel (PUCCH).

31. The apparatus of claim 30, wherein the memory holds further instructions for, in response to the determination that the uplink transmission is not in the interference limited condition relative to a neighboring cell:
providing a signal instructing the UE to perform power allocation for the multiple antennas in response to determining that AGI is below a predetermined threshold, to achieve a trade-off between receiver Signal-to-Interference-plus-Noise Ratio (SINR) loss and diversity gain; and
providing a signal instructing the UE to perform single antenna transmission in response to determining that AGI is above the predetermined threshold.

32. The apparatus of claim 30, wherein the memory holds further instructions for, in response to the determination that the uplink transmission is in the interference limited condition relative to a neighboring cell:
providing a signal instructing the UE to perform AGI compensation to balance radiated power from the multiple antennas.

33. A method for wireless communication, comprising:
providing control parameters for uplink transmission from multiple antennas of a user equipment (UE) in a wireless communication network;
receiving a report from the UE characterizing total power headroom and antenna gain imbalance (AGI) for the multiple antennas;
determining a power allocation scheme, a transmission rank and a precoding matrix in response to the report; and
transmitting the power allocation scheme, the transmission rank and the precoding matrix to the UE for use for uplink transmission.

34. The method of claim 33, further comprising normalizing a plurality of antenna selection vectors to provide normalized vectors, and using the normalized vectors as special precoding vectors.

35. An apparatus for wireless communication, comprising:
means for receiving a report for total power headroom and received Antenna Gain Imbalance (AGI) as received at a user equipment (UE) in a wireless communication network;
means for determining a power allocation scheme, a transmission rank, and precoding matrix for the transmission rank uplink in response to the report; and
means for transmitting the power allocation scheme, the transmission rank and the precoding matrix to the UE for use for uplink transmission.

36. The apparatus of claim 35, further comprising means for normalizing a plurality of antenna selection vectors to provide normalized vectors, and using the normalized vectors as special precoding vectors.

* * * * *